United States Patent [19]

Martin et al.

[11] 4,105,900
[45] Aug. 8, 1978

[54] SIGNAL SELECTION APPARATUS FOR REDUNDANT SIGNAL SOURCES

[75] Inventors: Donald L. Martin, Bellevue; David B. Yanke, Seatle, both of Wash.

[73] Assignee: The Boeing Company, Seattle, Wash.

[21] Appl. No.: 769,395

[22] Filed: Feb. 16, 1977

[51] Int. Cl.² .................. H03K 17/00; G05B 9/03
[52] U.S. Cl. .................................. 307/219; 307/355; 244/194; 318/564
[58] Field of Search ............. 307/204, 219, 243, 355, 307/357; 244/194; 318/564

[56] References Cited

U.S. PATENT DOCUMENTS

| 3,551,776 | 12/1970 | Tawfik et al. | 244/194 X |
|---|---|---|---|
| 3,663,879 | 5/1972 | Salamon et al. | 318/564 |
| 3,813,990 | 6/1974 | Coppola et al. | 244/194 X |
| 3,881,670 | 5/1975 | Doniger | 244/194 |

Primary Examiner—John Zazworsky
Attorney, Agent, or Firm—Christensen, O'Connor, Johnson & Kindness

[57] ABSTRACT

Apparatus for signal selection and signal consolidation of the redundant sensor signals in a triply redundant control system wherein one of the redundant sensors supplies precise information and the remaining two sensors supply less precise information is disclosed. Signal selection is based on the operational state of the three sensors, with the signal provided by the precision sensor being selected whenever the precision sensor is operational. If the precision sensor fails, each channel is supplied with a signal that is a weighted average of the signals supplied by the two less accurate sensors. In some arrangements of the invention whenever the precision sensor has not failed, but supplies a signal that deviates substantially from the signals being supplied by the two less accurate sensors, the signal supplied to each channel of the control system is a weighted average of all three sensor signals. In other arrangements of the invention, a weighted average of the signals supplied by the two less precise sensors is provided whenever the precision sensor fails and whenever the precision sensor has not failed, but supplies a signal that deviates substantially from the signals being supplied by the two less accurate sensors. To prevent abrupt variations in the signal supplied to the control system, the signal supplied by the signal selection apparatus smoothly transists from the signal being supplied at the time a particular failure condition occurs to the signal to be supplied following that failure.

16 Claims, 7 Drawing Figures

SIGNAL SELECTION APPARATUS FOR REDUNDANT SIGNAL SOURCES

BACKGROUND OF THE INVENTION

This invention relates to the field of control systems. More particularly, this invention relates to signal selection and consolidation apparatus, responsive to a plurality of redundant input signals, for supplying a single, reliable signal for use in apparatus such as a control or computational system.

In some situations, a control or computational system must exhibit a system reliability factor that exceeds that obtainable with a system which utilizes a single component to perform each system function. One common approach to such a problem is the replacement of one or more system components with a set of system components, each of which is capable of preforming the same system function as the replaced component. In this design approach, the system includes logic means for detecting a component failure and selecting an unfailed system component for operation within the system at any given time. In such a system, the set of components that perform a substantially identical function, and the signals such system components produce, are referred to as "redundant" since less than the full set of redundant components or signals are required for satisfactory system operation.

Depending on the system configuration and the desired reliability factor, redundancy can be implemented in a variety of manners. By way of illustration, a typical flight control or guidance system for an aircraft often includes one or more different types of sensors or transducers that supply data such as aircraft attitude and a computational unit which is responsive to the sensor signals for generating control signals to position the aircraft control surfaces. In such a control system, redundancy may be employed by utilizing sets of independent sensors to replace one or more of the different system sensors, or the system can be fully redundant, utilizing a set of independent sensors to replace each type of sensor and an equal number of computational units.

With respect to state-of-the-art redundant control systems, full redundancy is often implemented with the system being arranged as a number of separate "channels." For example, a triply redundant system is often arranged as three separate channels, each of which effectively constitutes a complete control system, with the system further including means for monitoring the operation of each redundant component to detect component failure or malfunction. By arranging the system in such a manner, fail/operational and fail/operational-fail/passive system operation can be achieved. In fail/operational operation when a particular redundant component fails, the system logic detects the faulty component and isolates it from the system so that the system continues to operate, utilizing unfailed components. In fail/operational/fail/passive operation, the system is fully operative upon the failure of a first redundant component and automatically enters a passive mode of operation upon the failure of a second redundant component. Generally, when a second failure causes such a system to enter the passive mode, the control signals are no longer utilized, e.g., supplied to the aircraft control surfaces, and manual control thereof is usually initiated.

In many situations, one or more of the redundant signals are time-varying or analog signals. It can be recognized in such a situation that, although the sensors or other apparatus supplying the redundant signals may be of an identical design, the redundant signals will not be perfectly identical. To supply the system with a "best" or "correct" signal, the signal selection logic or prior art redundant control systems generally includes apparatus for either selecting a particular one of the redundant signals for use within each of the system channels or apparatus for deriving or forming a signal on the basis of the signals supplied by the operational redundant components. In the art, combining the redundant signals to supply a derived signal is sometimes known as signal consolidation, a definition which will be adhered to herein. One common example of such signal consolidation is supplying a derived signal of a magnitude equal to the mathematical average of the redundant signals (i.e., the sum of the redundant signals divided by the number of redundant signals). With respect to the signal selection apparatus wherein a selected redundant signal is supplied to each channel of the system, "voting" is often employed wherein one of the redundant signals is selected according to some predetermined criteria (e.g., the median signal is selected).

Although prior art signal slection system are often satisfactory in applications in which the redundant components are of identical design and hence supply redundant signals of substantially the same accuracy or precision, situations can arise in which it is advantageous or necessary to utilize a set of redundant components in which one or more of the components supplies more precise or more reliable information than the remaining redundant components. For example, in an aircraft flight control system, pitch attitude information can be supplied from a number of various sources including inertial navigation systems and conventional vertical gyros. Although the attitude information supplied by an inertial navigation system is more precise or accurate than attitude information supplied by vertical gyros (and maintains such accuracy over a longer period of time), the coat of a redundant set of inertial navigation systems is generally prohibitive. In this and similar circumstances, it would be desirable to utilize a single precise instrument such as an inertial navigation system and less precise instruments such as the vertical gyros to constitute a redundant set of sensors. More explicitly, it would be desirable to provide signal selection and consolidation apparatus that provides the control system with the precise signal supplied by the inertial guidance system whenever such system is operational and provides the control system with a signal representative of the information provided by the vertical gyros whenever the inertial guidance system is inoperative.

Prior art signal selection apparatus is not emenable to such a situation since such prior art apparatus effectively treats each redundant signal with equal deference. For example, if a prior art signal selection system is utilized wherein signal consolidation is effected by deriving a signal that is the average of the applied redundant signals, full advantage of the precise information supplied by the precision component will not be achieved. On the other hand, if prior art signal selection apparatus using "voter" techniques are utilized, a signal supplied by one of the less precise redundant sensors will often be selected rather than the signal supplied by the more precise sensor.

Furthermore, significant problems have been encountered with respective prior art signal selection and consolidation apparatus. First, it is generally both necessary and desirable to prevent abrupt changes in the signal level being supplied to a control system when one of the redundant components fail. For example, in many instances, the signal being supplied to the system at the time a redundant sensor fails is of substantially different magnitude than the signal which is to be supplied immediately after such sensor failure. With respect to systems such as aircraft flight control systems, an abrupt transition between the signal supplied prior to component failure and the signal supplied subsequent to component failure often cannot be tolerated by the control system and can well have catastrophic results. Although prior art signal selection and consolidation apparatus often includes means for equalizing the signal provided immediately following a component failure with the signal provided at the time such failure occurs, such means have not proven entirely satisfactory and oftentime overall system performance is degraded.

A second related problem exists will respect to monitoring the redundant signals to detect failure of one of the redundant components. Specifically, this problem relates to establishing the criteria upon which the apparatus will declare a particular component inoperative. For example, the signals supplied by a redundant set of sensors are often compared with one another and the failure of the particular component declared when the discrepancy between the signal supplied by that component and the redundant signal supplied by another of the redundant set exceeds a predetermined threshold. In such systems, nuisance disconnects and mode cycling can be experienced if the comparative thresholds are too tight. On the other hand, wide comparative thresholds can permit undesirably large signal transitions to be applied to the system if a sensor suddenly fails and generates such a signal transition or "step input." Such step inputs are in addition to and can have the same effect on a control system as a previously described abrupt signal transitions.

This problem is especially relevant in situations in which one of the redundant components supplies more precise information than the remaining redundant components. Specifically, it can be recognized that in such a situation it is advantageous to utilize a rather wide comparative threshold in determining whether the precise component has failed since, in all probability, the signal supplied by such a precise component is as accurate as those signals provided by the less precise components even when substantial signal deviation occurs between the signal provided by the more precise component and the signals supplied by the less precise components. On the other hand, such precise components are also subject to a failure mode wherein an abrupt signal transition of substantial magnitude is generated. In this respect, prior art signal selection and consolidation apparatus, designed to operate with sets of substantially identical redundant components, are not configured to utilize the precise signal over a range in which the signal is likely to be as accurate as the signal supplied by the less precise components while simultaneously preventing a step input that can be generated by the sensor during certain failure modes from reaching the system.

Accordingly, it is an object of this invention to provide signal selection and signal consolidation apparatus for use in applications wherein one component of a set of redundant system components supplies a more precise signal than the remaining components of the set of redundant components.

It is a further object of this invention to provide such signal selection and consolidation apparatus wherein the signal supplied does not exhibit an abrupt change in magnitude upon the failure of one of the redundant components.

It is another object of this invention to provide signal selection and signal consolidation apparatus for use with a set of redundant signal sources wherein one of the redundant signal sources provides more precise information than the remaining redundant signal sources such that the signal supplied by the precise sensor is supplied as an output signal during periods of time in which the precise sensor is operational.

SUMMARY OF THE INVENTION

These and other objects are achieved in accordance with this invention by signal selection logic arranged to supply logic signals indicative not only of the failure state of each of the redundant sensors, but also of a "suspect state" wherein the precision sensor has not failed but the deviation between the signals supplied by the precision sensor and the less precise sensors exceeds that deviation which can be expected to result because of the difference in the sensor accuracies. These logic signals are coupled to a signal consolidator that is arranged to supply a derived steady-state output signal which is identical to the signal supplied by the precision sensor whenever the precision sensor is fully operative, i.e., not failed or in the suspect state, and supply a derived signal that is a mathematically weighted average of the signal supplied by the less precise sensors whenever the precision sensor has failed. Depending on the redundant system in which the invention is employed, the signal supplied when the precision sensor is in the suspect state can be either a mathematically weighed average of the signals supplied by the less precise sensors, or is a mathematically weighted average of the signals supplied by all operational sensors including the signal being supplied by the precision sensor.

In addition to providing the above described steady-state output signals, the signal consolidator is arraged to prevent abrupt transitions or "steps" in the output signal whenever a sensor failure (or entrance of the precision sensor into the suspect state) causes the signal consolidator to switch from one derived output signal to another. More explicitly, when the signal selection logic supplies a logic signal which will cause a differently derived steady-state signal to be supplied by the signal consolidator, the signal consolidator causes the derived output signal to smoothly converge from the derived signal being supplied prior to the sensor failure to the derived signal to be supplied if the sensor failure condition persists.

In one disclosed embodiment, the invention is incorporated in a redundant system wherein triply redundant sensors (one precision sensor and two less precise sensors) are utilized to supply a derived signal to a single system component such as a computational unit. In this arrangement of the invention, the signals supplied by the redundant sensors are coupled to a sensor failure detector, a signal selection logic, and the signal consolidator. The sensor failure detector includes logic circuitry for comparing the signals supplied by the redundant sensors one with another and declaring one of the sensors to be failed or inoperative whenever the difference between the signal supplied by that particular sensor deviates from the signal supplied by the other sensors by a predetermined amount. To prevent mode cycling and spurious failure indication, the sensor failure detector preferably includes logic circuitry which prevents a declaration that a sensor is inoperative until such failure persists for a predetermined time period (e.g., one second).

The logic signals supplied by the sensor failure detector are coupled to a system failure detector which includes logic circuitry for effecting fail/operational-fail/passive operation by detecting the concomitant failure of two of the redundant sensors, and are coupled to the signal selection logic. The signal selection logic includes means for comparing the signal supplied by the precision sensor with the signals supplied by the less precise sensors. Whenever the signal variation between the signal supplied by the precision sensor and the less precise sensors exceeds a threshold level representative of the normal signal deviation that can be expected because of the greater accuracy of the precision sensor, logic circuitry within the signal selection logic supplies a signal indicating that the precision sensor is operating within the suspect state. If the precision sensor is not operating in the suspect state, but is fully operational, the signal selection logic supplies a second logic signal. On the other hand, if the precision sensor has failed, the signal selection logic supplies a third logic signal.

The signal consolidator of this embodiment includes three signal paths that are individually associated with and activated by the three logic signals supplied by the signal selection logic. In effect, each logic signal closes one of the signal paths to couple an appropriately derived signal to the output terminal of the signal consolidator. More explicitly, whenever the precision sensor is fully operational, the logic signal supplied by the signal selection logic causes the steady state signal at the signal consolidator output terminal to be identical to the signal supplied by the precision sensor; whenever the precision sensor has failed, the signal supplied by the signal selection logic causes the steady state output of the signal consolidator to be a mathematically weighted average of the signal supplied by the two less precise sensors; and, whenever the precision sensor is operating in the suspect state, the logic signal supplied by the signal selection logic causes the steady state output of the signal consolidator to be a mathematically weighted average of the signals supplied by all three of the redundant sensors.

Each signal path of the signal consolidator is arranged to prevent abrupt level changes or transitions in the derived signal that can occur when sensor failure (or entrance of the precision sensor into the suspect state) causes the signal consolidator to switch between differently derived signals. To prevent these abrupt signal transitions, the signal within each unactivated signal path is equalized to the signal being supplied by the activated signal path and, when signal path switching occurs, feedback is supplied within the newly activated signal path to cause the signal derived by the signal consolidator to smoothly converge to the new steady state signal.

In a disclosed arrangement of a fully redundant three channel control system, the signal supplied by each redundant sensor is directly coupled to an associated system channel and each channel receives the signal supplied by the two remaining sensors via interchannel signal paths. Each channel includes signal selection and signal consolidation apparatus similar to the signal selection and signal consolidation networks of the system in which only the sensors are redundant. In this system arrangement, a system failure detector is utilized that declares a channel failure whenever the sensor directly coupled to that channel has failed or the computational unit within that channel has failed and declares system failure when two system channels have failed.

In a realization of such a fully redundant control system which employs a digital computer in each system channel to perform the necessary circuit operations and computations, the signal selection and signal consolidation of this invention can be practiced by appropriately configuring the system and sequencing the digital computer. As is disclosed relative to one such system, the derived signal during periods of time in which the precision sensor operates in the suspect state can be a mathematically weighed average of the two less precise sensors rather than being a mathematically weighted average of all three redundant sensor signals.

BRIEF DESCRIPTION OF THE DRAWINGS

Other objects and advantages of the present invention will become apparent to one skilled in the art after a reading of the following description taken together with the accompanying drawings, in which:

FIG. 4 is a schematic diagram of a system failure detector suitable for use when the invention is embodied in a fully redundant system such as that depicted in FIG. 3;

DETAILED DESCRIPTION

Figure 1:
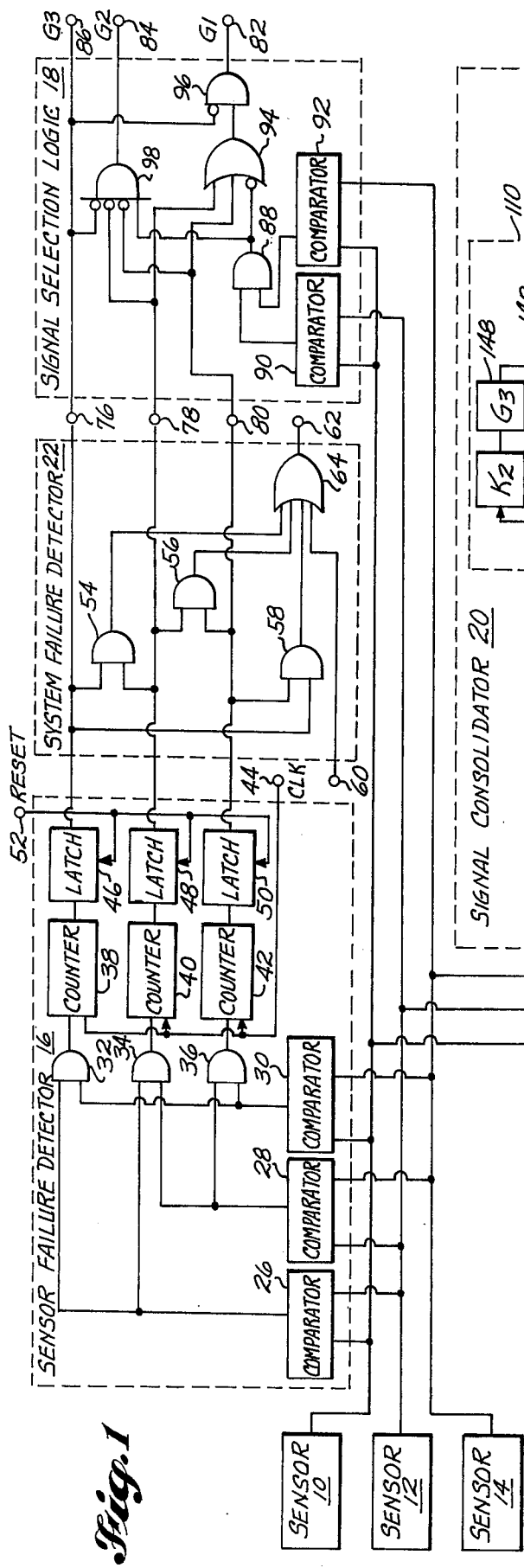
FIG. 1 is a schematic block diagram of a system having three redundant sensors that embodies the signal selection and signal consolidation apparatus of this invention.
Figure 3:
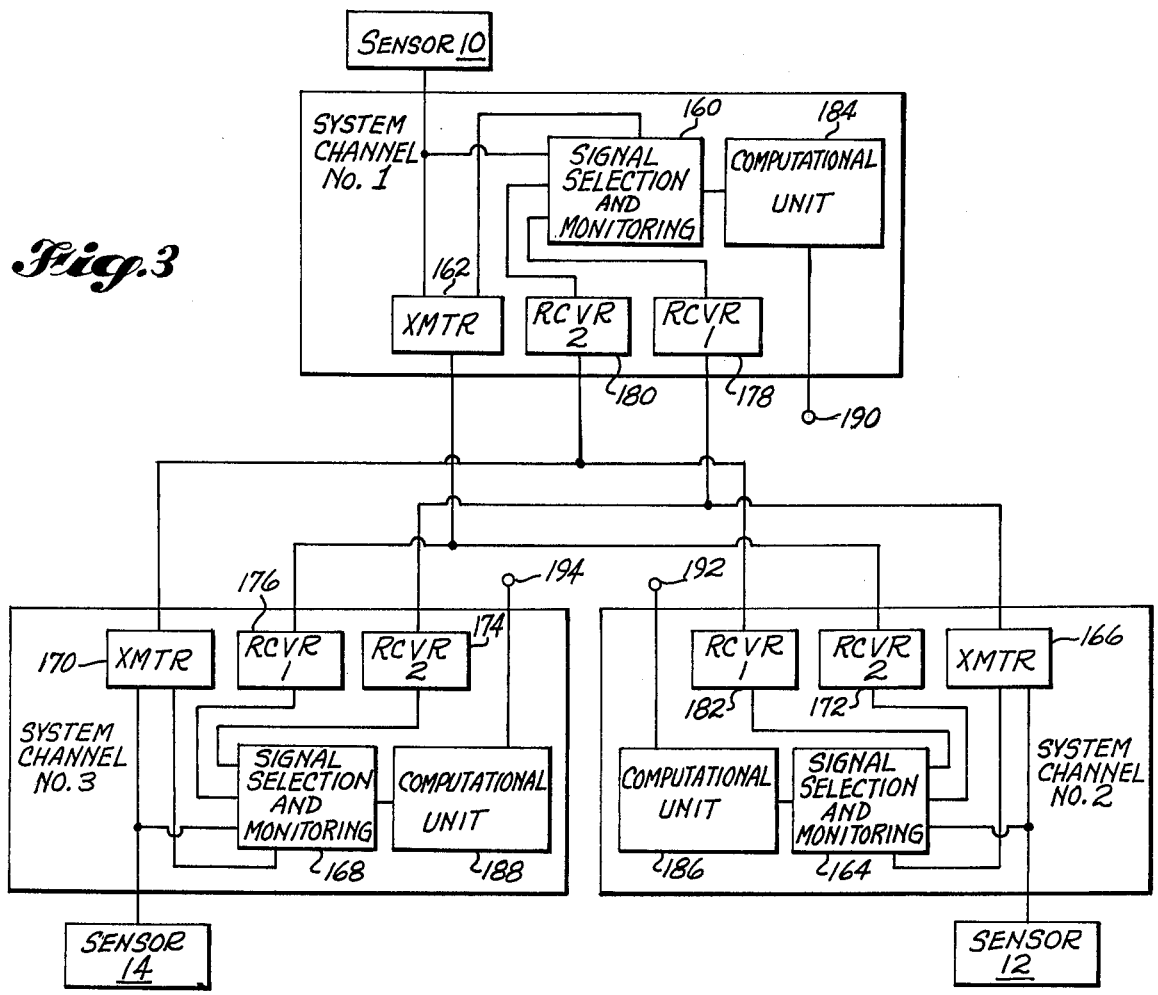
FIG. 3 is a block diagram of a fully redundant three channel control system in accordance with this invention.
Figure 5A:
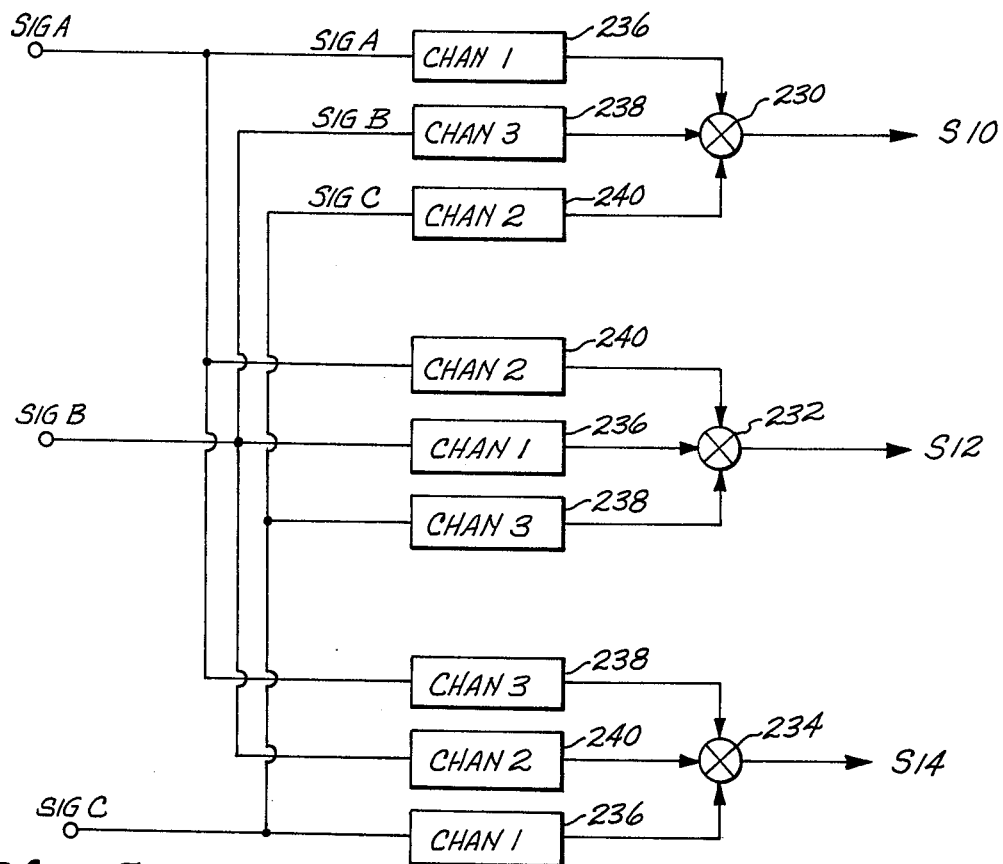
FIGS. 5A and 5B respectively depict a block diagram and a logic diagram illustrating the operational arrangement utilized to identify the redundant sensor signals when the invention is incorporated in the type of triply redundant system depicted in FIG. 3 wherein each system channel includes a programmable digital computer; and, FIG. 6 depicts a logic diagram illustrating the operational arrangement of each channel of a type of fully redundant system wherein each channel includes a programmable digital computer to effect the signal selection and consolidation of this invention.

As is known in the art, redundant control and computational systems can be embodied in a variety of manners. As shall be described in detail hereinafter, the signal selection and signal consolidation apparatus of this invention can be suitably embodied for operation with most existing system arrangements and a wide range of system arrangements that may be designed in the future. In this respect, FIG. 1 depicts the invention embodied in a control or computational system which utilizes a set of redundant sensors arranged to supply a signal to a single computational unit; FIGS. 3 and 4 depict an embodiment of the invention in a fully redundant system wherein redundant sensors and redundant computational units are arranged to form separate channels; and, FIGS. 5 and 6 depict utilization of the invention in a system of the type depicted in FIG. 3 wherein the computational unit of each channel is a programmable digital computer.

In the triply redundant control system depicted in FIG. 1, a precision sensor 10 and two less precise sensors 12 and 14 constitute a set of three redundant signal sources that supply a redundant set of signals to a sensor failure detector 16, a signal selection logic unit 18, and a signal consolidator 20. In operation, the sensor failure detector 16 monitors the operation of the sensors 10, 12 and 14 to supply a logic signal representative of the operational state of each sensor. These logic signals are combined with a logic signal representative of the operational state of the computational unit of the system in which the invention is employed (not shown in FIG. 1) within a system failure detector 22 to develop a signal whenever failure of the computational unit or various sensor failures render the system inoperative. Logic signals supplied by the system failure detector 22 are logically combined within the signal selection logic 18 to form digital control signals for activating the signal consolidator 20.

As shall be discussed in detail hereinafter, the signal consolidator 20 supplies the system computational unit with a steady-state signal at an output terminal 24 that is identical to the signal supplied by the precision sensor 10 whenever the sensor 10 is functioning properly and supplies a signal that is the mathematical average of the signal supplied by the two less precise sensors 12 and 14 whenever the high quality sensor 10 has failed. Additionally, whenever the signal supplied by the precision sensor 10 has not failed, but deviates from the signal supplied by the sensors 12 and 14 by a predetermined amount, the signal consolidator 20 supplies an output signal that is the mathematical average of the signal supplied by the two less precise sensors 12 and 14, i.e., $\frac{1}{2} S_{10} + \frac{1}{4}(S_{12} + S_{14})$ where $S_{10}$, $S_{12}$ and $S_{14}$ respectively denote the signals supplied by the redundant sensors 10, 12 and 14.

The sensor failure detector 16 includes three conventional comparator circuits 26, 28 and 30 of the type wherein an output signal is supplied whenever the magnitude of the difference between two applied signals exceeds a predetermined threshold value. In the arrangement of FIG. 1, the comparators 26, 28 and 30 are connected to compare the signal supplied by each sensor 10, 12 and 14 with the signal supplied by the other two redundant sensors to thereby detect a failure of the sensor 10, the sensor 12, or the sensor 14. More explicitly, the two input terminals of the comparator 26 are connected to receive the redundant signals supplied by the sensors 10 and 12, with the comparator 26 supplying an output signal of a first magnitude (e.g., corresponding to a logical zero), when the difference between the signal supplied by the sensors 10 and 12 is less than a predetermined threshold level and supply an output signal of a second magnitude (e.g., corresponding to a logical one), when the difference between the redundant signals supplied by sensors 10 and 12 exceeds the predetermined threshold level. In a similar manner, the input terminals of comparator 28 and comparator 30 are respectively connected to receive a pair of redundant signals supplied by the sensors 12 and 14 and a pair of redundant signals supplied by the sensors 10 and 14. In the depicted embodiment, comparator 28 supplies an output signal corresponding to a logical zero when the difference between the redundant signals supplied by sensors 12 and 14 is less than the predetermined threshold level of comparator 28 and supplies an output signal corresponding to a logical one when the difference signal exceeds the predetermined threshold level. In a like manner, comparator 30 supplies an output signal corresponding to a logical zero when the difference between the redundant signals supplied by sensors 10 and 14 is less than the predetermined threshold level of comparator 30 and supplies an output signal corresponding to a logical one when the difference signal exceeds the predetermined threshold level.

To determine which, if any, of the sensors, 10, 12 and 14 are inoperative, the output signals supplied by the comparators 26, 28 and 30 are logically combined by AND gates 32, 34 and 36. Specifically, the output signal supplied by comparator 26 is coupled to one input terminal of a 2-input AND gate 32 and a one input terminal of a 2-input AND gate 34; the signal supplied by comparator 28 is coupled to the second input terminal of the AND gate 34 and one input terminal of a 2-input AND gate 36; and, the output signal supplied by comparator 30 is coupled to the second input terminal of the AND gate 32 and the second input terminal of the AND gate 36. With this arrangement, when one of the sensors 10, 12 or 14 is inoperative, a corresponding AND gate 32, 34 or 36 will supply an output signal equal to a logical one. For example, if the precision sensor 10 fails, the difference between the signals supplied by sensor 10 and sensor 12 will cause the comparator 26 to supply a logical one to one input terminal of the AND gate 32 and the difference between the signals supplied by the sensors 10 and 14 will cause the comparator 30 to supply a logical one to the second input terminal of the AND gate 32 thus causing the AND gate 32 to supply a logical one at its output terminal. In a similar manner, should sensor 12 fail, the difference between the signals supplied by the sensors 12 and 10 and the difference between the signals supplied by sensors 12 and 14 causes comparators 26 and 28 to supply logical ones to the input terminals of the AND gate 34, which, in turn, causes the AND gate 34 to supply a logical one at its output terminal. Should sensor 14 fail, the difference between the signals supplied by sensors 14 and 10 causes the comparator 30 to supply a logical one to a first input terminal of the AND gate 36 and the difference between the signals supplied by sensors 14 and 12 causes the comparator 28 to supply a logical one to a second input terminal of the AND gate 36 to, in turn, cause the AND gate 36 to supply a logical one at its output terminal.

To prevent spurious signals or transients from causing an indication of sensor failure, the output terminals of the AND gates 32, 34 and 36 are respectively connected to the input terminals of counter circuits 38, 40 and 42. Each counter circuit 38, 40 and 42 is a conventional digital circuit arranged to supply an output signal whenever a predetermined number of input pulses (e.g., logical ones) have been supplied to the counter input terminal. More explicitly, each pulse of a periodic clock signal, applied to the counters 38, 40 and 42 via a clock terminal 44 causes the respective counter to advance by one count whenever the corresponding AND gate 32, 34, 36 simultaneously supplies a logical one signal. In this arrangement, each counter is effectively a time delay network which prevents a declaration of sensor failure until the signal supplied by that sensor deviates from the two remaining redundant signals for a predetermined time. For example, following an initial failure of the precision sensor 10, the signal supplied by the counter 38 does not become a logical one for a period of time equal to np, where n is the predetermined count established by the interconnection of counter 38 and p is the pulse repetition period of the applied clock signal.

To further prevent transient conditions from causing an erroneous declaration that the sensor 10, 12 and 14 is inoperative, the counters 38, 40 and 42 can be arranged such that the count is decremented whenever the signal supplied by the AND gates 32, 34 and 36 indicate that a sensor is operational after first indicating that a sensor has failed. For example, in one embodiment of the arrangement depicted in FIG. 1, the counters 38, 40 and 42 are conventional up/down counters with each counter being connected such that the count stored therein is incremented whenever the corresponding AND gate 32, 34, 36 supplies a logical one signal in time coincidence with a clock pulse and is decremented at one-half the clock repetition rate whenever the corresponding AND gate 32, 34, 36 supplies a logical zero. Such an arrangement can be realized by connecting the output terminal of the AND gates 32, 34 and 36 directly to the count up terminals of the corresponding counters 38, 40 and 42 and coupling the output terminals of the AND gates 32, 34 and 36 to the count down terminals of the counters 38, 40 and 42 by means of a circuit such as a clocked set/reset flip flop so that each counter is decremented on count each time the logical signal supplied by the corresponding AND gate remains a logical zero for two consecutive clock pulses.

To maintain a failure indication once the counter circuits 38, 40 and 42 have indicated the failure of a sensor 10, 12 or 14, the output signals of the counter circuits 38, 40 and 42 are respectively connected to the input terminals of conventional digital latch circuits 46, 48 and 50. Latch circuits 46, 48 and 50 effectively store a logical one whenever the corresponding sensors 10, 12 or 14 has failed so that the sensor failure detector 16 continues to indicate sensor failure even though the failed sensor may begin to supply an acceptable signal after the corresponding counters 38, 40 or 42 has reached the full predetermined count level. To permit the sensor failure detector 16 to be reset after a first failure indication of the sensor 10, 12 or 14, the latch circuits 46, 48 and 50 are reset by supplying an appropriate electrical signal to a reset terminal 52. If the counter 38, 40 or 42 contains a full count when the sensor failure detector 16 is reset, the corresponding latch circuit 46, 48 and 50 will immediately be loaded with a logical one to again indicate sensor failure. If, however, the previously failed sensor 10, 12 or 14 is no longer inoperative, the corresponding counter 38, 40 or 42 will have been decremented in the previously described manner and a sensor failure will no longer be indicated.

The system failure detector 22 of the arrangement depicted in FIG. 1 logically combines the sensor failure signals, supplied by the latch circuits 46, 48 and 50 of the sensor failure detector 16, with a logic signal supplied to terminal 60 by the system computational unit (not shown in FIG. 1) to supply a digital signifying system failure whenever the computational unit has failed or whenever two of the sensors 10, 12 and 14 have failed. To provide this logic signal, the system failure detector 22 includes an AND gate 54 connected to receive the signals supplied by the latches 46 and 48; an AND gate 56, connected to receive the signals supplied by the latches 48 and 50; and, an AND gate 58 connected to receive the signals supplied by the latches 46 and 50. The output terminals of the AND gates 54, 56 and 58 are connected to three input terminals of a 4-input OR gate 64. The fourth input terminal of the OR gate 64 is connected to a terminal 60 which receives a signal corresponding to a logical one whenever the system computational unit has failed. Accordingly, it can be recognized that the OR gate 64 supplies a logical one to the system failure terminal 62 whenever either the system computational unit is inoperative, or any two of the sensors 10, 12 or 14 have failed.

It can be recognized that the system failure detector 22 of FIG. 1 facilitates fail/operational-fail/passive system operation with respect to the redundant sensors 10, 12 and 14 and facilitates fail/passive operation with respect to the system computational unit. More explicitly, as long as the system computational unit is operative, the signal supplied to the system failure terminal 62 remains a logical zero even though one of the sensors 10, 12 or 14 fails. However, upon the occurrence of the second sensor failure, the system failure detector 22 supplies a logical one to the terminal 62. Since the system failure detector 22 supplies a logical one to the terminal 62 whenever the system computational unit is inoperative, fail/passive operation is effected relative to the computational unit.

The logic signals which are supplied by the latch circuits 46, 48 and 50 to indicate the failure state of the sensors 10, 12 and 14 are respectively coupled to input terminals 76, 78 and 80 of the signal selection logic 18. The signal selection logic 18 combines these signals to supply logic signals denoted as $G_1$, $G_2$ and $G_3$ at output terminals 82, 84 and 86 of the signal selection logic 18 for controlling the operation of the signal consolidator 20. As shall be described in more detail hereinafter, the logic signals $G_1$, $G_2$ and $G_3$ are mutually exclusive logic variables in that only one of the logic variables can be equal to a logical one at any given time. As shall be discussed relative to the signal consolidator 20, the logic signals $G_1$, $G_2$ and $G_3$ effectively open and close selected signal paths within the signal consolidator 20 to provide the signal applied by the precision sensor 10 to the output terminal 24 whenever the sensor 10 is operative; to provide a signal equal to the mathematical average of the signal supplied by the sensors 12 and 14 whenever the sensor 10 is inoperative; and, to provide a weighted average of the signals supplied by all three sensors 10, 12 and 14 whenever the precision sensor 10 is operative but the signal supplied by the sensor 10 deviates substantially from the redundant signals supplied by sensors 12 and 14. Such an operative state wherein sensor 10 has not been declared inoperative by operation of the sensor failure detector 16, but in which the output signal of sensor 10 deviates substantially from each of the redundant signals supplied by the less precise sensors 12 and 14 is defined herein as a "suspect state."

In accordance with this invention, the suspect state is generally established such that the information supplied by the sensor 10 during operation in the suspect state is generally as reliable as the information supplied by the less precise sensors 12 and 14. That is, since the precision sensor 10 generally supplies more accurate information than the less precise sensors 12 and 14, deviations between the signal supplied by the sensor 10 and the signal supplied by the less precise sensors 12 and 14 do not necessarily reflect a malfunction of the sensor 10, but may only reflect the difference between the accuracies of the sensors. Thus, by considering the accuracy of an operative precision sensor 10 relative to the accuracy of operational sensors 12 and 14, three operational states of a precision sensor 10 are defined in accordance with this invention. First, when the redundant signal supplied by the precision sensor 10 deviates from the redundant signals supplied by the less precise sensors 12 and 14 by more than a first predetermined amount - as determined by the comparator thresholds of the sensor failure detector 16 - the signal supplied by the senor 10 cannot be considered reliable and the sensor 10 is declared inoperative. Secondly, when the deviation between the redundant signal supplied by the precision sensor 10 and the redundant signals supplied by the less precise sensors 12 and 14 is less than a second predetermined amount, such deviations can be attributed solely to the difference in accuracy between the precision sensor 10 and the less precise sensors 12 and 14. Under such conditions, the sensor 10 is deemed fully operative and, in all probability, the redundant signal supplied by the sensor 10 is substantially more accurate than the signals supplied by the sensors 12 and 14. Thirdly, when the deviations between the redundant signals supplied by the precision sensors 12 and 14 exceeds this second predetermined threshold, but such signal deviations do not exceed the first predetermined threshold, the signal deviation cannot be attributed solely to differences in accuracy between the sensors, yet, in all probability, the signal supplied by the sensor 10 is as accurate or even more accurate than the signal supplied by the redundant sensors 12 and 14. As previously stated, this condition is defined herein as the suspect state and the signals supplied by the three sensors 10, 12 and 14, during such a condition, are combined within the signal consolidator 20 to supply an appropriately weighted signal to the control system utilizing the invention.

To determine when the sensor 10 is operating in the suspect state, the signal selection logic 18 includes a 2-input AND gate 88 and comparators 90 and 92. The redundant signals supplied by the sensors 10, 12 and 14 are supplied to the input terminals of the comparators 90 and 92 such that the comparator 90 supplies a logical one whenever the difference between the signal supplied by the sensor 10 and the sensor 12 exceeds the threshold of the comparator 90 and such that the comparator 92 supplies a logical one whenever the difference between the signal supplied by the sensor 10 and the sensor 14 exceeds the threshold level of the comparator 92. Since the output signals supplied by the comparators 90 and 92 are coupled to the input terminals of the AND gate 88, AND gate 88 supplies a logical one whenever the signal supplied by the sensor 10 deviates from the signals supplied by the sensors 12 and 14 by an amount equal to the threshold levels of the comparators 90 and 92. Accordingly, suitable equal threshold levels in comparators 90 and 92 cause the AND gate 88 to supply a logical one whenever the sensor 10 is operating within the previously defined suspect state.

To establish the logic variable $G_1$ equal to a logical one whenever the sensor 10 is fully operational, the output of the AND gate 88 is coupled to an inverting input terminal of a 3-input OR gate 94. It should be noted that an "inverting" input terminal refers to a logical negation performed either within the particular gate circuit or by an inverter circuit external to the gate circuit. For example, 3-input OR gate 94, which has one inverting input and two conventional inputs, supplies a logical one whenever the signal applied to the inverting input terminal is a logical zero or the signal applied to either conventional input terminal is a logical one. As is the convention within the art, such inverting input terminals are denoted in FIG. 1 by small circles at the appropriate input terminals of the gate symbols. The two remaining input terminals of the OR gate 94 are connected to terminals 78 and 80 of the signal selection logic 18 which respectively receive signals from the latch circuits 48 and 50 of the sensor failure detector 16. The output signal supplied by the OR gate 94 is connected to one input terminal of a 2-input AND gate 96 having a second, inverting input terminal thereof connected to terminal 76 of the signal selection logic 18.

In view of this arrangement, it can be seen that the logic variable $G_1$, which is supplied by the AND gate 96 to the terminal 82, can be represented by the logic equation $$G_1 = (S12\ \text{FAIL} + S14\ \text{FAIL} + \overline{S10\ \text{SUS}}) \cdot \overline{S10\ \text{FAIL}} \tag{1}$$

where the symbol · denotes the logical AND operation, the symbol + denotes the logical OR operation, an overscore denotes a logical negation, S10 SUS denotes the suspect state of the sensor 10, and S10 FAIL, S12 FAIL, S14 FAIL, respectively denote the logic signals supplied to terminals 76, 78 and 80 to indicate the failure of the sensor 10, the sensor 12 and the sensor 14. Accordingly, in the embodiment of the invention depicted in FIG. 1, it can be noted that the logic variable $G_1$ is equal to a logical one as long as the sensor 10 is not declared inoperative and, in addition, one of the sensors 12 and 14 are inoperative or the sensor 10 is not operating in the suspect state.

The logic variable $G_2$ is set equal to a logical one by operation of a 4-input AND gate 98 whenever all three sensors 10, 12 and 14 are operative and the sensor 10 is operating in the suspect state. More explicitly, three inverting input terminals of the AND gate 98 are respectively connected to the terminals 76, 78 and 80, which receive the sensor failure signals from the system failure detector 22, and a fourth non-inverting input terminal of the AND gate 98 is connected to the output terminal of the AND gate 88, which supplies a logical one signal whenever the sensor 10 is operating in the suspect state. Accordingly, it can be recognized that the logic variable $G_2$, supplied by the operation of the AND gate 98 to the terminal 84, can be represented by the logic expression $$G_2 = \overline{S10\ \text{FAIL}} \cdot \overline{S12\ \text{FAIL}} \cdot \overline{S14\ \text{FAIL}} \cdot S10\ \text{SUS} \tag{2}$$

The logic variable $G_3$, supplied to the terminal 86 of the signal selection logic 18, is identically equal to the logic signal supplied to the input terminal 76 of the signal selection logic 18 by the system failure detector 22. Thus, in view of the above described operation of the system failure detector 22, and the sensor failure detector 16, it can be seen that the logic variable $G_3$ is equal to a logical one whenever the precision sensor 10 has failed.

The structure and operation of the signal consolidator 20 of the embodiment depicted in FIG. 1 can best be understood by first considering the steady-state operation for each of the system conditions defined above (i.e., $G_1=1$, $G_2=1$, or $G_3=1$) and then considering the transient operation that occurs when a system failure causes the signal consolidator 20 to effectively switch between signal paths to supply a differently derived sensor signal to the signal consolidator output terminal 24. Basically, the signal consolidator 20 can be viewed as comprising three signal paths, denoted by the numerals 100, 102 and 104 in FIG. 1, with each signal path being connected to the output terminal 24 whenever a corresponding logic variable $G_1$, $G_2$ or $G_3$, is respectively equal to a logical one. Interconnection of the signal paths 100, 102 and 104 to provide an appropriately derived signal to the output terminal 24 is respectively effected by the control circuits enclosed within dashed lines 106, 108 and 110 in FIG. 1. Specifically, the control circuit 106 is activated whenever the sensor 10 is fully operational ($G_1=1$) to supply the sensor 10 signal to the output terminal 24; the control circuit 108 is activated whenever none of the sensors 10, 12 and 14 has failed and sensor 10 is in the suspect state ($G_2=1$) to supply a signal to terminal 24 that is mathematically equal to $\frac{1}{2}$ S10 + $\frac{1}{4}$ ($S_{12}$ + $S_{14}$); and, the control circuit 110 is activated whenever the sensors 12 and 14 are operative and the sensor 10 is inoperative ($G_3=1$) to supply a signal to terminal 24 that is mathematically equal to $\frac{1}{2}$ ($S_{12}$ + $S_{14}$). As previously described, the logic variables $G_1$, $G_2$ and $G_3$ are mutually exclusive and accordingly, only one signal path 100, 102 or 104 supplies a signal to the output terminal 24 at any given instant of time.

To couple the redundant signal supplied by the precision sensor 10 to the output terminal 24 whenever the logic variable $G_1$ is equal to a logical one, the control circuit 106 includes a summing device 114 having a first additive input terminal connected to receive the output signal of the sensor 10 and a controlled gain unit 116 connected between the output terminal of the summing device 114 and the signal consolidator output terminal 24 via a summing device 112. The controlled gain unit 116 is a conventional circuit such as switched-gain amplifier or an electronic switching device, e.g., a field-effect transistor circuit, which effectively switches between substantially unity gain and a gain substantially equal to zero in response to the logic variable $G_1$. Thus, in the arrangement of FIG. 1, the controlled gain unit 116, and those controlled gain units described hereinafter, are effectively switches wherein an applied signal is conducted without substantial loss when the corresponding logic variable ($G_1$, $G_2$ or $G_3$) is equal to a logical one and wherein the switches exhibit effectively infinite loss to block an applied signal.

The control circuit 106 further includes a second summing device 118 having an additive input terminal thereof connected to the input terminal of the controlled gain unit 116 and a subtractive input terminal thereof connected to the signal consolidator output terminal 24. A conventional integrator circuit 120, having an integration constant of $K_1$, is connected between the output terminal of the summing device 118 and a subtractive input terminal of the summing device 114. As shall be described hereinafter, the integrator 120 causes the signal at the input terminal of the controlled gain unit 116 (denoted as $E_{a1}$ in FIG. 1) to be maintained equal to the signal at the signal consolidator output terminal 24 whenever $G_1$ is equal to a logical zero (i.e., the output signal of the signal consolidator 20 is being supplied via either signal path 102 or 104). This equalization or biasing of the input signal supplied to the controlled gain unit 116 prevents signal transients in the signal supplied to the signal consolidator output terminal 24 if the signal path 102 is activated (i.e., $G_2=1$) and a subsequent failure of the sensor 12 or 14 causes the signal selection logic 18 to activate the signal path 100 by setting the logic variable $G_1=1$. In addition, the control circuit 106 includes a fixed gain unit 122 and a second controlled gain unit 124 serially connected between the output terminal of the integrator 120 and a second subtractive input terminal of the summing device 118. As shall be described hereinafter, the gain units 122 and 124 operate in conjunction with the integrator 120 to exponentially eliminate or "wash out" the above described bias signal whenever the signal path 100 is activated, i.e., whenever the signal selection logic 118 sets the logic variable $G_1$ equal to a logical one following a period of time in which either the logic variable $G_2$ or the logic variable $G_3$ is equal to a logical one.

In examining FIG. 1, it can be seen that the circuit topology of each control circuit 108 and 110 is identical to the circuit topology of the logic circuit 106 with the controlled gain units of the control circuitry 108 and 110 being responsive to the logic variables $G_2$ and $G_3$, respectively. Specifically, the logic circuit 108 and the logic circuit 110 respectively include summing devices 126 and 138 and controlled gain units 128 and 140 that correspond to the summing device 114 and the controlled gain unit 116 of the control circuit 106. Controlled gain unit 128 and the summing device 126 and controlled gain unit 140 and the summing device 138 respectively couple the signal paths 102 and 104 to the signal consolidator output terminal 24 via the summing device 112. Additionally, the logic circuit 108 and the logic circuit 110 include summing devices 130 and 142 and integrators 132 and 144 which are interconnected in the same manner as the summing unit 118 and integrator 120 of logic circuit 106 for biasing the input terminals of the controlled gain units 128 and 140 whenever the associated signal path 102 and 104 is not activated. Fixed gain units 134 and 146 and controlled gain units 136 and 148 are included in the logic circuitry 108 and 110 with the gain units 134, 136, 146 and 148 being interconnected in the respective control circuitry in the same manner as the gain units 122 and 124 are interconnected in the logic control circuitry 106.

To couple a signal mathematically equal to $\frac{1}{2}$ ($S_{12}$ + $S_{14}$) to the signal path 104, the signal consolidator 20 includes a summing device 150 having two additive input terminals that are connected to receive the signals supplied by the sensors 12 and 14. The output terminal of the summing device 150, which supplies a signal equal to the sum of the signals supplied by the sensors 12 and 14, is coupled to the signal path 104 via a divider unit 152 which supplies a signal mathematically equal to $\frac{1}{2}$ of the signal supplied by the summing device 150. A variety of conventional divider networks suitable for the practice of this invention are known in the art, ranging from resistive networks to active networks such as an amplifier having a gain of $\frac{1}{2}$.

To couple a signal mathematically equal to $\frac{1}{2}$ $S_{10}$ + $\frac{1}{4}$ ($S_{12}$ + $S_{14}$) to the signal path 102, the output of the divider unit 152 is coupled to one additive input terminal of a summing device 154. A second additive input terminal of the summing device 154 is connected to receive the signal supplied by the sensor 10. The output terminal of the summing device 154 is connected to a second divider network 156, having a gain factor of $\frac{1}{2}$, the output terminal of which is connected directly to the signal path 102.

Figure 2:
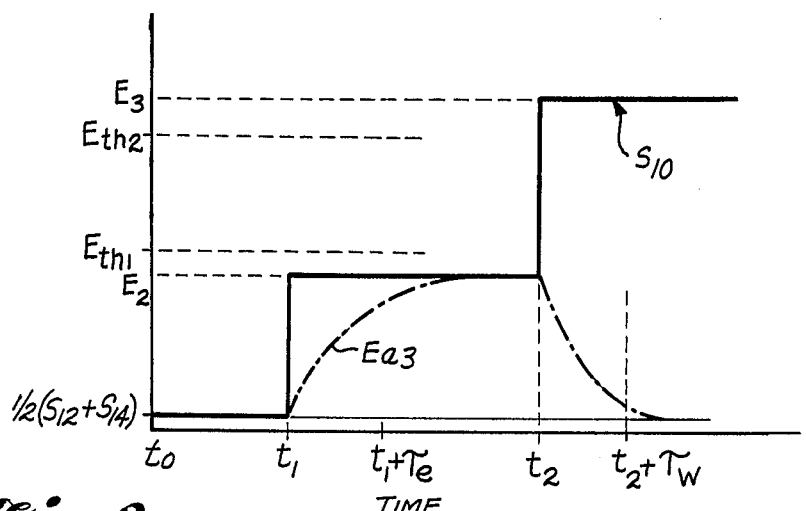
FIG. 2 graphically illustrates signal waveforms useful in understanding the operation of the embodiment of the invention depicted in FIG. 1 during transient signal conditions.

The operation of the control circuits 106, 108 and 110 to prevent abrupt signal transitions or transients from being coupled to the signal consolidator output terminal 24 when a sensor or system failure causes the signal consolidator 20 to switch from one signal path to another and hence supply a differently derived signal to each channel of the redundant system can be ascertained by an examination of FIG. 1 in conjunction with FIG. 2. As shall be described in the following paragraphs, the elimination of such abrupt signal transitions includes equalizing or biasing the steady-state signal at the input terminals of the unactivated controlled gain units 116, 128 and 140 with a signal which substantially corresponds to the signal level being supplied at the signal consolidator output terminal 24, and "washing-out" or smoothly eliminating this bias signal when a particular controlled gain unit 116, 128 or 140 is activated upon a failure of one of the sensors 10, 12 or 14. For the purposes of illustration, FIG. 2 is a simplified graphical depiction of a situation in which the precision sensor 10 abruptly fails at time $t_2$ to cause the signal selection logic 18 to set the logic variable $G_1$ equal to zero and set the logic variable $G_3$ equal to 1. Hence, in FIG. 2, the redundant signal, $S_{10}$, supplied by the precision sensor 10 will be the selected sensor signal prior to time $t_2$ and a signal equal to the mathematical average of the signal supplied by the sensors 12 and 14 will be supplied following the failure of sensor 10 at time $t_2$.

Referring to FIG. 2, during the time period $t_0$–$t_1$, the signal $S_{10}$ is depicted as being slightly greater in magnitude than the mathematical average of the signal supplied by sensors 12 and 14, identified as $\frac{1}{2}(S_{12} + S_{14})$ in FIG. 2. Since, during the time period $t_0$–$t_2$, the difference between the signal $S_{10}$ and the signals $S_{12}$ and $S_{14}$ is less than the threshold level $E_{th1}$, where the interval between $E_{th1}$ and $E_{th2}$ defines the previously described suspect state for the sensor 10, the logic variable $G_1$ is equal to a logical one and the output signal supplied to the signal consolidator output terminal 24 of FIG. 1 will correspond to the signal $S_{10}$ at all times less than $t_2$ (assuming the controlled gain unit 116 has an ideal frequency response). Since logic variable $G_3$ is set equal to zero during the time interval $t_0$–$t_2$, both controlled gain units 140 and 148 of the control circuit 110 of FIG. 1 exhibit gain factors of substantially zero to respectively block signal flow into the summing device 112 and block the flow of a feedback signal around the integrator circuit 144. Likewise since the logic variable $G_2$ is equal to zero during the time interval $t_0$–$t_2$, no signal is coupled to the signal consolidator output terminal 24 via the signal path 102.

Under these conditions, it can be observed in FIG. 1 that two signal paths exist which could influence the voltage $E_{a3}$ at the input terminal of the controlled gain unit 140. First, the signal $\frac{1}{2}(S_{12} + S_{14})$ is coupled to the input terminal of the controlled gain unit 140 via the summing device 138 with the integrator circuit 144 providing negative feedback from the input terminal of the controlled gain unit 140 to the summing device 138. Since this signal path is effectively a unity gain circuit having an integrator connected in the feedback path, it can be recognized that the transfer function of the signal path between the output terminal of the fixed gain unit 152 and the input terminal of the controlled gain unit 140 is $s/(s + K_1)$ where $s$ is the Laplacian operator and $K_1$ is the integration constant of the integrator 144. As is known in the art, a network exhibiting such a transfer function is commonly called a simple lead network and exhibits a time domain step response of $E_{out} = E_i e^{-K_1 t}$ where $E_{out}$ is the output signal supplied by the simple lead network at any time $t$, $E_i$ is the magnitude of a step voltage applied to the input of the network, and $e$ is the base of the system of natural logarithms. Since the time domain response is an exponentially decaying transient term, it can be recognized that rather abrupt changes in the signal level supplied by the fixed gain unit 152 are coupled to the input terminal of the controlled gain unit, but when the signal $\frac{1}{2}(s_{12} + S_{14})$ is constant as shown in FIG. 2, this signal path makes no contribution to the steady-state signal $E_{a3}$.

The second signal path contributing to the voltage $E_{a3}$ during a time period in which $G_3$ is not equal to a logical one, e.g., the time interval $t_0$–$t_2$, couples the signal consolidator output signal, $E_0$, to the input terminal of the controlled gain unit 140 via the summing device 142, the integrator 144, and the summing device 138 with the input terminal of the controlled gain unit 140 being coupled to the input terminal of the integrator 144 via the summing device 142 to provide a feedback signal. Such an arrangement is often referred to as a unity feedback network and in the case in which the gain device is an integrator such as integrator 144, it can be shown that the response of the network corresponds to the response of a simple lag network. As is known in the art, a simple lag network exhibits a transfer function of $K_1/(s + K_1)$ and, a step input of magnitude $E_i$ is applied to the network, exhibits a time-domain response of $E_{out} = E_i(1-e^{-K_1 t})$. Thus, at time $t_1$ in FIG. 2, when the signal $S_{10}$ supplied by the precision sensor 10 exhibits an abrupt change in signal level, the signal $E_{a3}$ exponentially increases to the new value of $E_2$ of the sensor signal $S_{10}$ with a time constant of $1/K_1$. Since the control variable $G_1$ is equal to a logical one during the time interval $t_0$–$t_2$ of FIG. 2, the signal provided to the output terminal 24 of the signal consolidator 20 is substantially identical to the signal $S_{10}$ at all times between $t_0$ and $t_2$. Accordingly, it can be recognized that the steady-state signal $E_{a3}$, appearing at the input terminal of the controlled gain unit 140, is biased to a level substantially equal to the output signal being provided by the signal consolidator 20. Further, due to the previously described identical circuit topology of the control circuits 106, 108 and 110, it can be recognized that the input terminal of each controlled gain unit 116, 128 and 140 is similarly biased to a level corresponding to the magnitude of the signal being supplied by the signal consolidator 20 whenever that particular controlled gain unit is not activated, i.e., whenever the associated logic variable $G_1$, $G_2$ and $G_3$ is equal to a logical zero.

With the controlled gain units biased as described, essentially no signal transition occurs as a failure of sensor 10, 12 or 14 causes the signal consolidator 20 to switch between the signal paths 100, 102 and 104. For example, in the situation depicted in FIG. 2, a failure of the sensor 10 is illustrated by an abrupt transition in the signal $S_{10}$ between the signal levels $E_2$ and $E_3$ at time $t_2$. Since the difference between the signal level $E_3$ and the signals $S_{12}$ and $S_{14}$ exceeds the failure threshold $E_{th2}$ of the sensor 10, such a signal transition causes the signal selection logic 18 of FIG. 1 to set the logic variable $G_1$ equal to zero and the logic variable $G_3$ equal to a logical one.

As previously described, setting the logic variable $G_3$ equal to a logical one connects the signal path 104 to the signal consolidator output terminal 24 via the summing device 112. Since, at time $t_2$, the input terminal of the controlled gain unit 140 is biased to the level $E_2$, the signal supplied to the output terminal 24 does not abruptly change to the current value of $\frac{1}{2}(S_{12} + S_{14})$, but remains equal to $E_2$ as the signal path 104 is connected to the output terminal 24.

As can be seen in FIG. 1, when the logic variable $G_3$ is set equal to a logical one at time $t_2$, feedback is provided between the input and output terminals of the integrator 144 via the gain unit 146 and the controlled gain unit 148. Examining this feedback arrangement, and noting that the signal at the output of the integrator 144 at time $t_2$ (identified as $E_{fb3}$ in FIG. 1) is identically equal to $E_2$, it can be shown that the change in the signal $E_{fb3}$ is equal to $-E_2(1-e^{-K_1K_2t})$ where $K_1$ is the integration constant of the integrator 144 and $K_2$ is the gain constant of the gain unit 146. Since, neglecting variations in the signal ½ $(S_{12} + S_{14})$, the signal $E_{a3}$, and hence the signal appearing at the output terminal 24 is equal to the difference between $E_{a3}$ at time $t_2$ ($E_2$) and the signal change in the signal $E_{fb3}$, it can be recognized that the voltage $E_{fb3}$ exponentially approaches 0 with a time constant $1/K_1K_2$. Thus, as is illustrated in FIG. 2, the signal $E_{a3}$, and hence the output signal coupled to the terminal 24 of the signal consolidator 20 smoothly converges from the equalized level $E_2$ to the desired signal level ½ $(S_{12} + S_{14})$.

It will be recognized by those skilled in the art that the parameters $K_1$ and $K_2$ are each established in view of the control system to which the invention supplies signals. For example, when the invention is utilized in an aircraft flight control system, the gain constant $K_2$ is established such that the time constant $1/K_1K_2$ causes a bias signal washout rate that provides a proper input signal to the control system as rapidly as possible without causing the aircraft control system to generate command signals that exceed the capability of the aircraft control system or cause violent maneuvers of the aircraft. The integration constant $K_1$ is generally established in view of the normal variation of the sensor signals with respect to time. That is, the integration constant $K_1$ is selected such that normal changes in transducer signal level will be coupled to the associated controlled gain unit 116, 128 and 140 without appreciable attenuation or distortion.

FIG. 3 depicts an arrangement of a fully redundant control system comprising three substantially identical channels each of which are directly supplied with a redundant sensor signal and are supplied with the remaining two redundant sensor signals via interchannel transmission paths. In practicing the present invention in such an arrangement, each of the channels is configured to include a sensor failure detector; a system failure detector; signal selection logic; and a signal consolidator similar to those depicted in FIG. 1.

More explicitly in the triply redundant control system of FIG. 3, a precision sensor 10 is connected to a signal selection and monitoring unit 160 and a transmitter 162 in channel 1 of the redundant system. Similarly, a pair of less precise sensors 12 and 14 are respectively connected to signal selection and monitoring units 164 and 168 and transmitters 166 and 170 which are associated with system channels number 2 and number 3. Each transmitter 162, 166 and 170 couples the associated sensor signal to the two remaining system channels. In this respect, the output of the transmitter 162 is connected to a receiver 172 of system channel number 2 and a receiver 176 of the system channel number 3; the output signal supplied by the transmitter 166 of the system channel number 2 is connected to a receiver 174 of system channel number 3 and a receiver 178 of system channel number 1; and, the output signal supplied by the transmitter 170 of system channel number 3 is coupled to a receiver 180 of system channel number 1 and a receiver 182 of system channel number 2. Since the output signal supplied by each particular receiver 172, 174, 176, 178, 180 and 182 is connected to the signal selection and monitoring unit 160, 164 and 168 of the system channel in which that particular receiver is located, each signal selection and monitoring unit 160, 164 and 168 receives the triply redundant sensor signals supplied by the sensors 10, 12 and 14. It will be recognized that various conventional devices can be utilized as transmitters and receivers in the type of redundant control system depicted in FIG. 3. Further, it will be recognized by those skilled in the art that such transmitters and receivers are often arranged to cross couple various other system data between the three system channels.

Each signal selection and monitoring unit 160, 164 and 168 includes circuit means corresponding to the sensor failure detector 16, the system failure detector 22, the signal selection logic 18 and the signal consolidator 20 of the embodiment depicted in FIG. 1. Thus, in the arrangement of FIG. 3, each channel includes means for independently deriving a best or most suitable sensor signal from the redundant signals supplied by the sensors 10, 12 and 14. As previously described relative to the embodiment of FIG. 1, in accordance with this invention, the signal selection and monitoring units 160, 164 and 168 supply an output signal identical to the signal being supplied by the sensor 10 whenever the more precise sensor 10 is fully operative and supply a signal which is the weighted average of the signals supplied by the sensors 12 and 14 whenever the sensor 10 has failed. As illustrated in FIG. 3, the signals provided by the signal selection and monitoring units 160, 164 and 168 are respectively coupled to computational units 184, 186 and 188 of the system channels number 1, 2 and 3. Each computational unit 184, 186 and 188 includes circuitry for utilizing the signals provided by the signal selection and monitoring units and, in some cases, signal information provided by other sources, to provide the desired system output signals, e.g., signals for activating the control surfaces of an aircraft flight control system. In the simplified system diagram of FIG. 3, these control signals are respectively coupled from the computational units 184, 186 and 188 to output terminals 190, 192 and 194.

When the invention is embodied in a fully redundant system such as that depicted in FIG. 3, it is often advantageous or necessary to define the system failure and the signal selection criteria somewhat differently than has been described relative to the embodiment of FIG. 1. For example, in one realization of the triply redundant system of FIG. 3, the monitoring circuit of the signal selection and monitoring units 160, 164 and 168 are arranged to supply digital signals respectively indicating failure of system channels 1, 2 and 3 whenever the sensor directly connected to a particular channel or the computational unit associated with that channel is inoperative. In this arrangement, a digital signal indicating overall system failure is supplied whenever two system channels are inoperative. Such an arrangement effects fail/operational-fail/passive operation with respect to both the set of redundant sensors 10, 12 and 14 and the set of redundant computational units 184, 186 and 188. Such a system arrangement can be realized by replacing the system failure detector 22 of FIG. 1 with the system failure detector 22' of FIG. 4 so that each signal selection and monitoring unit 160, 164 and 168 includes a sensor failure detector 16, a system failure detector 22', a signal selection logic 18, and a signal consolidator 20.

To provide an indication of the failure of each channel of the triply redundant system of FIG. 3, the system failure detector 22' of FIG. 4 includes 2-input OR gates 196, 198 and 200 with the first input terminals 202, 204 and 206 of the OR gates 196, 198 and 200 being respectively connected to the output terminals of the latches 46, 48 and 50 of the sensor failure detector 16 (FIG. 1). The second input terminals 208, 210 and 212 of the OR gates 196, 198 and 200 are respectively connected to receive a logical signal representative of the operational state of the computational units 184, 186 and 188, which as previously described are respectively associated with the system channels 1, 2 and 3. In particular, the computational unit of each channel includes conventional monitoring circuitry to determine a failure of the computational unit with the signal representative of the failure state of particular computational unit being directly coupled to the system failure detector 22' associated with the same system channel, and being coupled to the system failure detectors 22' of the other system channels via the channel interconnection paths, e.g., the transmitter-receiver arrangement depicted in FIG. 3.

The output terminals of the OR gates 196, 198 and 200 are respectively connected to output terminals 214, 216 and 218 of the system failure detector 22'. These output terminals are respectively connected to the input terminals 76, 78 and 80 of the signal selection logic 18 of FIG. 1.

Thus the OR gates 196, 198 and 200 respectively supply logical signals CH1FAIL = S10FAIL + COMP 184 FAIL; CH2FAIL = S12FAIL + COMP 186 FAIL; and, CH3FAIL = S14FAIL + COMP 188 FAIL, where COM 184 FAIL, COMP 186 FAIL, and COMP 188 FAIL respectively denote the logic signals which indicate a failure of the computational units 184, 186 and 188. In view of these channel failure signals and the previously described operation of the signal selection logic 18, it can be seen that in this embodiment of the invention, the signal selection logic 18 supplies logic control variables $G_1$, $G_2$ and $G_3$ to the associated signal consolidators 20 in accordance with the following logic equations.

$$G_1 = (CH2FAIL + CH3FAIL + \overline{S10SUS}) \cdot \overline{CH1FAIL} \quad (3)$$

$$G_2 = (\overline{CH1FAIL} \cdot \overline{CH2FAIL} \cdot \overline{CH3FAIL} \cdot S10SUS) \quad (4)$$

$$G_3 = CH1FAIL \quad (5)$$

Accordingly, it can be recognized that, with this embodiment of the invention, the signal selection logic 18 not only causes the signal consolidator 20 to switch between the signal paths 100 and 102 and 104 as a function of the failure state of the sensors 10, 12 and 14, but also to switch between the signal paths 100, 102 and 104 as a function of the failure state of the computational units 184, 186 and 188. More explicitly, in this embodiment of the invention the logic variable $G_1$ is equal to a logical one, thus causing the signal consolidator 20 to supply a steady-state signal identical to the signal being supplied by the sensor 10, whenever neither sensor 10 nor the computational unit 184 has failed and the sensor 10 is not operating in the suspect state or either sensor 12, sensor 14, computational unit 186, or computational unit 188 has failed. Whenever either the sensor 10 or the computational unit 184 fails, the signal selection logic 18 sets the logic variable $G_3$ equal to a logical one to thereby cause the associated signal consolidator 20 to supply a signal mathematically equal to one-half of the sum of the redundant signals supplied by the sensors 12 and 14. Whenever the sensor 10 is operating in the suspect state with all three computational units 184, 186 and 188 and all three sensors 10, 12 and 14 not being in the failure state, the signal selection logic 18 sets the logic variable $G_2$ equal to a logical one to thereby cause the associated signal consolidator 20 to supply an output signal mathematically equal to $\frac{1}{2} S_{10} + \frac{1}{4} (S_{12} + S_{14})$.

To provide an indication of system failure when two of the system channels are inoperative, the signal supplied by the OR gates 196, 198 and 200 of the system failure detector 22' depicted in FIG. 4 are coupled to the input terminals of 2-input AND gates 220, 222 and 224. In particular, the output terminal of the OR gate 196 is connected to one input terminal of the AND gate 220 and one input terminal of the AND gate 222; the output terminal of the OR gate 198 is connected to the second input terminal of the AND gate 222 and one input terminal of the AND gate 224; and, the output terminal of the OR gate 200 is connected to the second input terminal of the AND gate 220 and the second input terminal of the AND gate 224. The output terminals of the AND gates 220, 222 and 224 are connected to input terminals of 3-input OR gate 226. With this arrangement, it can be recognized that the AND gate 220 supplies a logical one signal to the OR gate 226 whenever the OR gate 196 and the OR gate 200 supply logical one signals (i.e., system channels 1 and 3 have failed); the AND gate 222 supplies a logical one signal to the OR gate 226 whenever the OR gates 196 and 198 simultaneously supply logical ones (i.e., channels 1 and 2 have failed); and, the AND gate 224 supplies a logical one to the OR gate 226 whenever both the OR gate 198 and the OR gate 200 supply logical one signals (i.e., channels 2 and 3 have failed). Accordingly, it can be recognized that the OR gate 226 supplies a logical one signal to the system failure terminal 228 whenever two system channels have simultaneously failed. Since the system failure detector 22' of each of the three channels of the triply redundant control system depicted in FIG. 3 supply a system failure signal, triple redundancy in system failure detection is effected. To insure that a system failure condition is not declared due to a malfunction within one of the system failure detectors 22', these system failure signals can be cross coupled between the channels of the system and compared with one another such that two or more of the system failure detectors 22' must indicate a system failure before an actual system failure is declared.

In situations in which a redundant system must operate in real-time to supply a substantial number of output or control signals that are effectively derived from a large number of input signals, systems of the variety depicted in FIG. 3 can be embodied with programmable digital computers being used in each of the system channels. Advantageously, signal selection and consolidation as described herein can be incorporated in such a system. For example, the signal selection and consolidation of this invention is embodied in a digital flight control system for an advanced short take off and landing aircraft that is currently under development. A more detailed understanding of this particular digital flight control system then will be imparted by the general description herein included can be ascertained from AIAA Paper No. 75-1087, entitled "YC-14 Digital Control Data Management," authored by Richard E. Kestek and AIAA Paper No. 75-1027 entitled "YC-14 Flight Control," authored by Allan H. Lee.

In the particular digital flight control system in which the invention is embodied, each system channel, i.e., channels 1, 2 and 3 of FIG. 3, include an interface unit and a computational unit. Each interface unit receives signal information from redundant sensors that supply aircraft attitude and configuration information, aircraft motion information, and pilot command information with a particular interface unit receiving signals from a particular sensor within a triply redundant set of such sensors. The signals received by the interface units, which can be two-wire or three-wire analog signals of various fixed or indeterminate frequency characteristics, discrete or two-level signals or momentary or various time duration, and digital signals in either serial or parallel format, are converted within the interface units and transmitted to the associated computational unit in a suitable digital format.

Each computational unit of this particular system is a conventional, programmable, digital computer that includes an input/output circuit, storage units, and an arithmetic unit for performing the necessary arithmetic and logic operations. The input/output unit, under the control of a program, transfers data received from the sensors to appropriate storage locations within the storage unit, transfers information to the arithmetic unit for the necessary computational operations, and transfers the control signals computed within the arithmetic unit either directly to the aircraft control surface actuators, or transfers such control signals to the storage unit for later transmittal to the control surfaces.

To provide interchannel coupling of the redundant sensor signals this particular flight control system includes optical coupling between the computational units of channels 1, 2 and 3. In this optical coupling arrangement, each redundant sensor signal, coupled from an interface unit to an associated computational unit, is converted to an optical signal by means of light-emitting diodes and the resulting optical energy is transmitted to the computational units of the two remaining channels via a fiberoptic transmission cable. Each computational unit thus receives the redundant sensor signals supplied to the other two channels. The optical signals representing the redundant sensor signals supplied the other two channels are converted to electrical signals within each computational unit and are directed to the associated arithmetic unit during appropriate computational periods. With respect to mechanizing the signal selection and consolidation of this invention within such a digital flight control system, a set of triply redundant sensor signals wherein one of the sensors supplies more precise information than the two remaining sensors of the redundant set can thus be made available within each computational unit of the above described digital system and, as shall be described hereinafter, can be utilized during a predetermined time interval for signal selection and consolidation.

To increase the versatility, reliability and maintainability of the particular triply redundant digital flight control system described above, the computational units of each channel are identically programmed. Identically programming each computational unit means that a set of three redundant signals will not be received by each computational unit as a specifically ordered set of three information elements. More explicitly, with reference to FIG. 3, the above described digital flight control system is arranged such that each system channel 1, 2 and 3 stores or arranges an arriving set of redundant signals as a set of signals (SIG A, SIG B, SIG C) where SIG A is the signal provided by the redundant sensor directly associated with that channel, SIG B is the redundant sensor signal received by means of receiver 1 of that channel (i.e., receivers 176, 178 and 182 and SIG C is the redundant sensor signal received by receiver 2 of that channel (i.e., receivers 172, 174 and 180). Thus with respect to channel 1, the set of redundant signals (SIG A, SIG B, SIG C) corresponds to the signal set ($S_{10}$, $S_{12}$, $S_{14}$); with respect to channel 2, the set of redundant signals (SIG A, SIG B, SIG C) corresponds to the signal set ($S_{12}$, $S_{14}$, $S_{10}$); and, with respect to channel 3, the set of redundant signals (SIG A, SIG B, SIG C) corresponds to the signal set ($S_{14}$, $S_{10}$, $S_{12}$).

In order to facilitate the previously described signal consolidation in such a digital flight control system, the sensor signals are collated or identified during one portion of the operational sequence performed by each computational unit 184, 186 and 188. The block diagram of FIG. 5A depicts the operation of each computational unit 184, 186 and 188 to properly identify the sensor signals. As shown in FIG. 5A, the signals SIG A, SIG B and SIG C are effectively connected to three summing devices 230, 232 and 234 via controlled gain units 236, 238 and 240. More explicitly, SIG A is respectively coupled to one input terminal of the three summing devices 230, 232 and 234 by a controlled gain device 236, a controlled gain device 240, and a controlled gain device 238; SIG B is respectively coupled to one input terminal of the three summing devices 230, 232 and 234 via a controlled gain device 240; and, SIG C is coupled to one input terminal of the three summing devices 230, 232 and 234 via a controlled gain device 240, a controlled gain device 238, and a controlled gain device 236, respectively. As is indicated in FIG. 5A, the controlled gain devices 236, 238 and 240 are respectively responsive to channel identification signals, denoted as CHAN1, CHAN2, CHAN3 in FIG. 3. Specifically, when the channel identification signal associated with the controlled gain units 236, 238 and 240 is a first predetermined signal, e.g., a logical one, the associated controlled gain unit exhibits essentially unity gain, and when a channel identification signal exhibits a second predetermined level, e.g., a logical zero, the associated controlled gain units exhibit substantially zero gain (infinite loss). Thus, as in the case of the controlled gain units described relative to the embodiment of FIG. 1, each controlled gain unit 236, 238 and 240 is effectively a switch that is controlled by an electrical signal to either pass a received signal without substantial attenuation thereof, or to block a received signal. In view of this arrangement, it can be seen that a discrete signal can be supplied within each of the system channels 1, 2 and 3 to properly identify that channel, and cause the circuit arrangement of FIG. 5A to properly associate the sensor signals $S_{10}$, $S_{12}$ and $S_{14}$ with the set of redundant signals SIG A, SIG B and SIG C that is present within that particular channel.

Figure 5B:
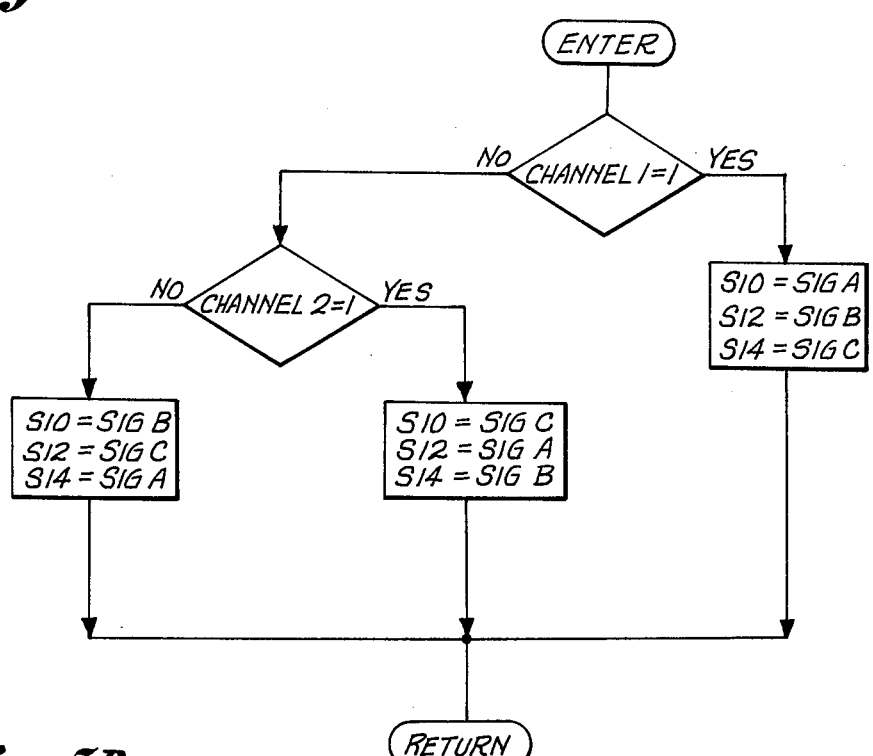
Figure 6:
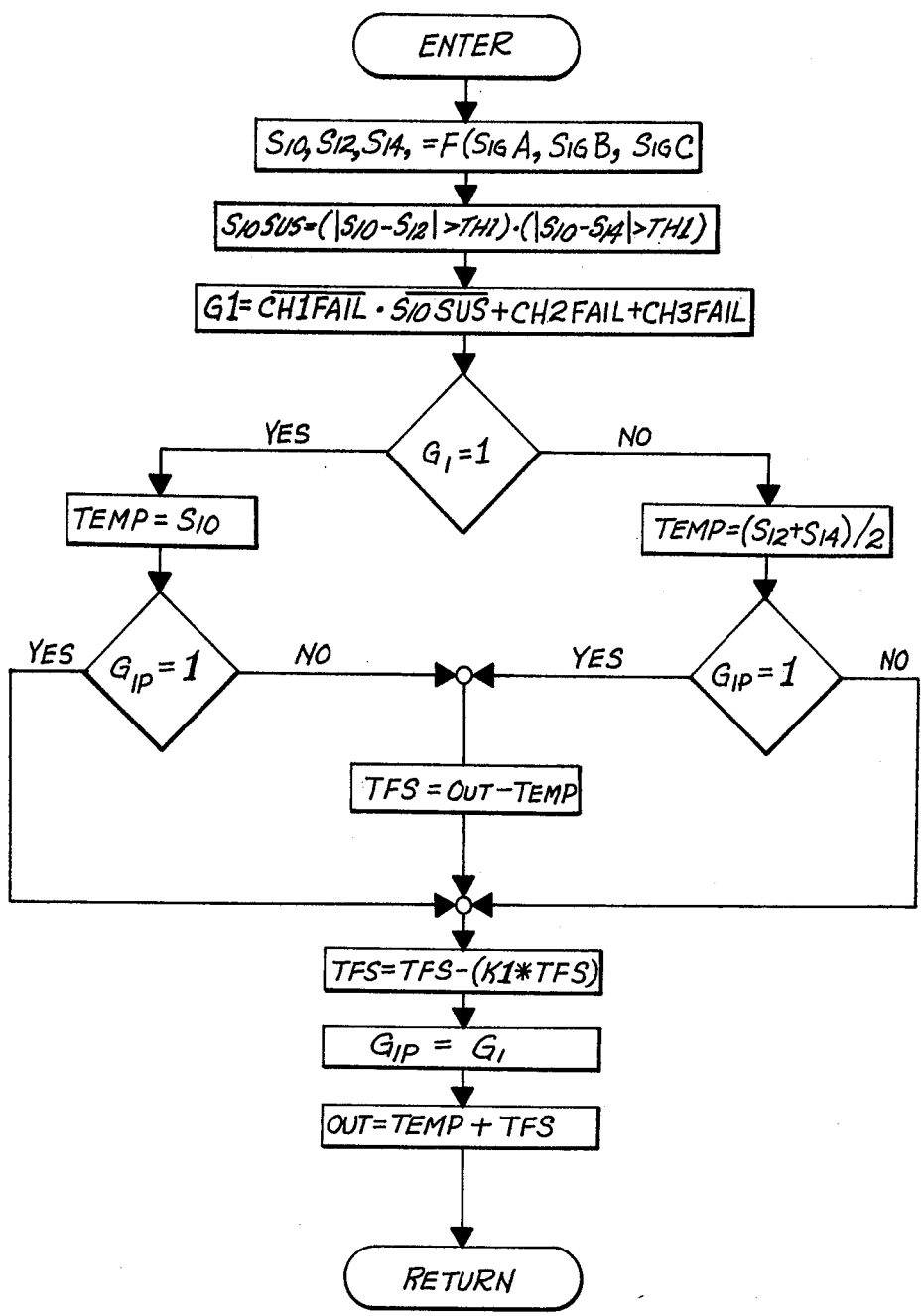

FIG. 5B depicts a flow chart for sequencing the computational units 184, 186 and 188 of the system channels 1, 2 and 3 of the above described digital flight control system to properly identify the redundant sensor signals $S_{10}$, $S_{12}$ and $S_{14}$ as depicted in FIG. 5A. In the arrangement of FIG. 5B, the channel identification signal CHAN1 is first tested to determine whether or not the signal is equal to a logical one. If the CHAN1 signal is equal to a logical one, the computational unit arranges or stores the SIG A signal as the sensor 10 signal ($S_{10}$), the SIG B signal as the sensor 12 signal ($S_{12}$) and the SIG C signal as the sensor 14 signal ($S_{14}$). If the channel identification signal CHAN1 is not equal to a logical one, the computational unit proceeds to determine whether the channel identification signal CHAN2 is equal to a logical one. If the channel identification signal CHAN2 is equal to a logical one, the computational unit associates the signal SIG C with the sensor 10, the signal SIG A with the sensor 12, and the signal SIG B with the sensor 14. If the channel identification signal CHAN2 is not equal to a logical one, the computational unit associates the signal SIG B with the sensor 10, the signal SIG C with the sensor 12, and the signal SIG A with the sensor 14. With the sensor signals $S_{10}$, $S_{12}$ and $S_{14}$ thus identified, signal selection and signal consolidation can then be effected within the computational units 184, 186 and 188 of FIG. 3.

The flow chart of FIG. 6 illustrates signal selection and signal consolidation suitable for use within the described digital flight control system. As shall be described hereinafter, the signal consolidation effected by the arrangement of FIG. 6 differs somewhat from the signal consolidation effected by the embodiment of the invention depicted in FIG. 1. In particular, the derived signal is equal to $\frac{1}{2}(S_{12} + S_{14})$ not only when the sensor 10 has failed, but also when the sensor 10 is in the suspect state. As described relative to the embodiment of the invention depicted in FIG. 1, the signal derived therein when the sensor 10 is in the suspect state is equal to $\frac{1}{2}S_{10} + \frac{1}{4}(S_{12} + S_{14})$. In general, utilizing signal consolidation wherein the derived signal is mathematically equal to the average of the signals supplied by the sensors 12 and 14 when the sensor 10 is in the suspect state is advantageous in embodiments of the invention that operate within a control system that is particularly susceptible to "hard-over failures" such as those that occur when a sensor fails and supplies a substantial transition in signal level.

Referring to FIG. 6, signal selection is achieved within the digital flight control system by first forming an ordered set of sensor signals ($S_{10}$, $S_{12}$, $S_{14}$) from the signals (SIG A, SIG B, SIG C) in accordance with the signal identification sequence of FIG. 5B. Each computational unit 184, 186 and 188 then determines whether the sensor 10 is operating in the suspect state by performing the logic operation $(|S_{10} - S_{12}| > TH1) \cdot (|S_{10} - S_{14}| > TH1)$ where the brackets denote determining the absolute value of the difference between the indicated signals $S_{10}$, $S_{12}$, and $S_{14}$ during the particular iteration period in which the sequence of FIG. 6 is being performed, $\cdot$ denotes the logical AND operation, and TH1 denotes the threshold value above which the sensor 10 is deemed to be in the suspect state, i.e., TH1 corresponds to the signal level $E_{th1}$ depicted in FIG. 2. The logic variable $G_1$ is then determined according to the previously defined logic equation (3). The logic variable $G_1$ is then tested to determine if $G_1$ is equal to a logical one. If $G_1$ is equal to a logical one, a variable TEMP is set equal to the signal level being suplied by the sensor 10 during that particular iteration of the computational unit.

Next it is determined whether or not the sensor 10 was operational during the nextmost antecedent iteration period of the computational unit. This determination is made by testing a logic variable $G_{1p}$, which is equal to the value of the logic variable $G_1$ during the nextmost antecedent iteration period, to determine if the logic variable $G_{1p}$ is equal to a logical one. If the sensor 10 was fully operational during the previous iteration, $G_{1p}$ is equal to a logical one and a variable TFS is set equal to TFS$(1-K_1)$ where $K_1$ is a constant which determines the rate at which the signal being supplied by the signal consolidation apparatus at the time of a sensor failure approaches the signal to be supplied following such a failure. As shall be described, the variable TFS effects transient-free switching as changes in component operational states occur, with TFS initially set at a value that is substantially equal to the difference between the signal being supplied during the nextmost antecedent iteration period prior to the failure of a redundant sensor and the signal that would be supplied should instantaneous switching be effected.

After establishing the value of TFS, the computational unit sets the value of $G_{1p}$ equal to the value of the logic variable $G_1$ so that $G_{1p}$ will be available during the next iteration period. The output signal to be supplied for that particular iteration is then established by setting the variable OUT equal to TEMP + TFS. This output signal is then utilized within the computational unit for determining the appropriate control signals for the aircraft control actuators, or is transmitted to other apparatus for use therein.

If after setting the variable TEMP equal to the sensor 10 signal being supplied during that particular iteration period it is determined that $G_{1p}$ is not equal to a logical one, the variable TFS is set equal to OUT - TEMP where OUT is the output signal supplied during the previous iteration. Since this situation corresponds to circumstances under which the selected signal was $(S_{12} + S_{14})/2$ during the nextmost antecedent iteration period, i.e., the sensor $S_{10}$ was either in the failure state or suspect state during the last iteration period, the value of TFS is set equal to $(S_{12} + S_{14})/2 - S_{10}$ (assuming that the selected signal had been the average of the signals supplied by the sensors 12 and 14 for a long enough time period to cause the variable TFS to become substantially equal to zero). On the other hand, if the value of OUT during the nextmost antecedent iteration period included a value of TFS, this value will be incorporated in the new value of TFS when the logic variable $G_1$ becomes a logical one after being equal to a logical zero during the nextmost antecedent iteration period.

In any case, the computational unit then proceeds to establish a new value of TFS equal to TFS$(1-K_1)$, establish $G_{1p}$ equal to $G_1$ and establish a new value of OUT equal to TEMP + TFS. In view of these operations, it can be observed that the derived signal for the first iteration period after $G_1$ changes from a logical zero to a logical one, OUT is equal to $(S_{12} + S_{14})/2 - K_1(S_{12} + S_{14})/2 + K_1S_{10}$ where $S_{12}$ and $S_{14}$ are respectively the values of the signals supplied by the sensors 12 and 14 during the previous iteration period and $S_{10}$ is the value of the signal supplied by the sensor 10 during the present iteration period. Thus it can be recognized that when $G_1$ becomes equal to one after being equal to zero, i.e., the sensor 10 becomes operational after being in the suspect state, that the signal supplied by the signal consolidation logic does not immediately become equal to the signal supplied by the sensor 10, but, with each successive iteration, is incremented toward this signal level by a quantity $K_1$ times the difference between the signal being supplied by the sensor 10 and the average of the signal supplied by the sensors 12 and 14 when the variable $G_1$ became equal to a logical one.

In view of the above description of the arrangement of FIG. 6, it can be recognized that should the logic variable $G_1$ remain equal to one during subsequent iterations, the derived output signal OUT is equal to $S_{10} + (1-K_1)^n$ TFS, where the variable $n$ denotes the $n^{th}$ iteration period, $S_{10}$ is the value of the signal supplied by the sensor 10 during the $n^{th}$ iteration, and TFS is the transient free function described above. Since $K_1$ is greater than zero and less than one, the value of $(1-K_1)^n$ approaches zero as $n$ increases. Accordingly, it can be recognized that the derived signal OUT will approach the value of the signal being supplied by the sensor 10 at a rate determined by the constant $K_1$.

The operation of the arrangement depicted in FIG. 6 whenever the logic variable $G_1$ is not equal to a logical one, i.e., the sensor 10 is either in the failure state or suspect state, is similar to the operation explained above with the derived signal OUT being set equal to the average of the signals supplied by the sensors 12 and 14 during any particular iteration period and any current value of the transient free switching function TFS. More explicitly, if the logic variable $G_1$ is not equal to a logical one, the variable TEMP is set equal to $(S_{12} + S_{14})/2$. If $G_1$ was not equal to a logical one during the nextmost antecedent iteration period, i.e., the logic variable $G_{1p}$ is not equal to a logical one, the derived signal OUT is set equal to TEMP plus the current value of the transient free switch function TFS. If $G_{1p}$ is equal to a logical one, i.e., the sensor 10 was operational during the nextmost antecedent iteration period, the value of the variable TFS is initially established equal to $S_{10} - (S_{12} + S_{14})/2$ where $S_{10}$ is the value of the signal supplied by the sensor 10 during the perious iteration period, and $S_{12}$ and $S_{14}$ are the values of the signal supplied by the sensors 12 and 14 during the current iteration period.

It will be recognized by those skilled in the art that the embodiments of the invention described herein are exemplary in nature and that many variations therein are within the scope and spirit of the invention. For example, in the embodiments wherein the derived signal supplied when the precision sensor is in the suspect state is a mathematically weighted signal which includes a signal contribution from each of the redundant signals, weighting factors other than those disclosed herein can be utilized. Specifically, it can be recognized that the signal $\frac{1}{2} S_{10} + \frac{1}{4}(S_{12} + S_{14})$, utilized in the disclosed embodiments, is simply one example of signal weighting having the general form $1/a\, S_{10} + (a-1)/2a$, where $a$ is a selected integer that determines the signal contribution of the sensor 10. Further, it will be recognized by those skilled in the art that the invention can be practiced in systems having a redundancy level greater than three by suitably configuring the disclosed circuitry.

What is claimed is:

1. Signal selection apparatus for supplying an output signal derived from a plurality of redundant signals supplied by a plurality of signal sources, each of said redundant signals representing substantially identical information with one of said signal sources being a precision signal source supplying more precise signal information than the remaining ones of said signal sources, said signal selection apparatus comprising:

signal selection means responsive to a signal source failure signal associated with each of said signal sources, each of said signal source failure signals indicating when the signal source associated therewith is operational and indicating when the signal source associated therewith operates in a failure state, said signal source selection means further responsive to said plurality of redundant signals, said signal source selection means including logic means for comparing said more precise signal supplied by said precision signal source with the signals supplied by the remaining signal sources, said logic means including means for supplying a first selection signal having a first predetermined value when the magnitude of said more precise signal exceeds the magnitude of each of the redundant signals supplied by said remaining signal sources by a first predetermined amount and having a second predetermined value when the magnitude of said more precise signal does not exceed the magnitude of each of said redundant signals supplied by said remaining signal sources by said first predetermined amount, said logic means further including means for supplying a second selection signal when said first selection signal is of said second predetermined value and said failure signal associated with said precision signal source indicates said precision signal source is operational; and signal consolidation means responsive to said redundant signals and responsive to said first and second selection signals for supplying said output signal, said signal consolidation means including means for supplying said more precise signal as said output signal when said signal selection means supplies said second selection signal, said signal consolidation means including means responsive to said signal source failure signal associated with said precision signal source for supplying said output signal as a mathematically weighted average of said signals supplied by said remaining signal sources whenever said signal source failure signal associated with said precision signal source indicates said precision signal source is operating in said failure state, said signal consolidation means further including means responsive to said first selection signal for supplying said output signal as a mathematically weighted average of at least said signals supplied by said remaining signal sources whenever said first selection signal is said first predetermined value.

2. The signal selection apparatus of claim 1 wherein said signal consolidation means responsive to said signal source failure signal associated with said precision signal source and said signal consolidation means responsive to said first selection signal each supply said output signal as a mathematically weighted average of said signals supplied by said remaining signal sources, said mathematically weighted average being equal to the summation of the instantaneous signal value supplied by each of said remaining signal sources divided by the number of said remaining signal sources.

3. The signal selection apparatus of claim 1 wherein said signal consolidation means responsive to said first selection signal supplies said output signal as a mathematically weighted average of all of said redundant signals, said mathematically weighted average being equal to the summation of the instantaneous signal values supplied by each of said remaining signal sources multiplied by a first rational number $(a - 1)/an$ added to a quantity equal to the instantaneous signal value supplied by said precision signal source multiplied by a second rational number $1/a$ where $a$ is a selected integer and $n$ is the number of signal sources included in said remaining signal sources.

4. The signal selection apparatus of claim 1 wherein said signal consolidation means includes signal transition means for supplying said output signal during a predetermined time interval subsequent to the time at which said logic means initially supplies said first and second selection signals and for supplying said output signal during a predetermined interval of time subsequent to the time at which said signal source failure signal associated with said precision signal source indicates that said precision signal source is operating in said failure state, said signal transition means including means for supplying said output signal during said subsequent time interval as a signal that smoothly transits between that output signal supplied by said signal consolidation means at a time immediately prior to said logic means initiating said first and second signal selection signal and immediately prior to said signal source failure signal indicating operation of said precision signal source in said failure state to said output signal supplied by said signal consolidation means at the time said predetermined interval of time terminates.

5. Signal selection apparatus for supplying an output signal derived from a plurality of redundant input signals, each of said redundant input signals being supplied by a signal source with one of said signal sources supplying a more precise signal than the remaining ones of said signal sources, said signal selection apparatus comprising:
detection means responsive to said redundant signals for supplying signal source failure signals associated with each of said redundant signal sources, said signal source failure signals being representative of the operational state of each of said signal sources to indicate when each of said signal sources fails to provide a reliable signal and to indicate when each of said signal sources provides a reliable signal;
signal selection logic means responsive to said signal source failure signals and responsive to said redundant signals for supplying at least a first and second signal selection signal, said signal selection logic means including comparator means for comparing said more precise signal with each of the remaining redundant signals supplied by said remaining signal sources, said comparator means including means for supplying said first signal selection signal when the magnitude of said more precise signal exceeds the magnitude of each of said remaining redundant signals by at least a predetermined threshold value, said signal selection logic means further including means for supplying said second signal selection signal when said signal source failure signal associated with the signal source supplying said more precise signal indicates said more precise signal source supplies a reliable signal and said first selection signal is not supplied by said comparator means; and
signal consolidation means responsive to said redundant signals supplied by said signal sources and responsive to said first and second signal selection signals for supplying said output signal derived from said redundant input signals, said signal consolidation means including first signal means for supplying said more precise signal as said output signal whenever said signal selection logic means supplies said second signal selection signal, said signal consolidation means including second signal means for supplying said output signal as a mathematically weighted average of said remaining redundant signals supplied by said signal sources other than the more precise signal source during periods of time when the failure signal associated with said more precise signal source indicates that said more precise signal source is not reliable, said signal consolidation means further including third signal means for supplying said output signal as a mathematically weighted average of at least said remaining redundant signals whenever said signal selection means supplies said first signal selection signal to indicate said more precise signal exceeds each of said remaining signals by at least said first predetermined threshold value.

6. The signal selection apparatus of claim 5 wherein said third signal means of said signal consolidation means includes means for supplying said output signal as a mathematically weighted average of said remaining redundant signals supplied by said signal sources other than said more precise signal source.

7. The signal selection apparatus of claim 6 wherein said mathematically weighted average of said remaining redundant signals is numerically equal to the summation of the instantaneous signal values of each of said remaining redundant signals divided by the number of signal sources other than said more precise signal source.

8. The signal selection apparatus of claim 5 wherein said third signal means of said signal consolidation means includes means for supplying said output signal as a mathematically weighted average of all of said redundant signals.

9. The signal selection apparatus of claim 8 wherein said mathematically weighted average of all of said redundant signals is equal to the product of $1/a$ times the instantaneous signal value of said more precise signal added to a quantity equal to the product of $(a - 1)/an$ times the summation of the instantaneous signal values of said remaining redundant signals where $a$ is a predetermined integer and $n$ is the number of signal sources other than said more precise signal source.

10. Signal selection apparatus for supplying an output signal derived from first, second and third redundant input signals wherein said first redundant input signal is a more precise signal than said second and third redundant signals in that the information conveyed by said redundant signals is more accurately represented by said more precise signal than said information is represented by the less precise second and third redundant input signals, said signal selection apparatus comprising:
signal selection logic responsive to first, second and third signal failure signals for supplying first, second and third signal selection signals, said first, second and third signal failure signals being respectively associated with said first, second and third redundant signals, each of said first, second and third signal failure signals having a first predetermined value when said associated redundant signal is supplied by a fully operational signal source, each of said first, second and third signal failure signals having a second predetermined value when said associated redundant signal is supplied by a non operational signal source, said signal selection logic including means for supplying a logic signal wherever the magnitude of said first redundant signal deviates from the magnitude of each of said second and third redundant signals by a first predetermined amount, said logic signal being a first predetermined value when said deviation between said magnitude of said first redundant signal and said magnitudes of said second and third redundant signals exceeds said first predetermined amount and being a second predetermined value when said deviation between said magnitude of said first redundant signal and said magnitudes of said second and third redundant signals is less than said first predetermined amount, said signal selection logic including means for supplying said first signal selection signal when said first failure signal is of said first predetermined value and either of said second and third failure signals is of said second predetermined value or said logic signal is of said second predetermined value, said signal selection logic means including means for supplying said second signal selection signal when said first, second and third failure signals are said first predetermined value and said logic signal is of said first predetermined value, said signal selection logic means further including means for supplying said third signal selection signal when said first failure signal is said second predetermined value; and, signal consolidation means responsive to said first, second and third redundant signals and responsive to said first, second and third signal selection signals for supplying said output signal, said signal consolidation means including first signal combining means for combining said second and third redundant signals to supply a first weighted signal mathematically equal to the sum of one-half the instantaneous value of said second redundant signal and one-half the instantaneous signal value of said third redundant signal, said signal consolidation means including second signal combining means for combining said first redundant signal and said first weighted signal to supply a second weighted signal mathematically equal to the sum of one-half the instantaneous value of said first redundant signal and one-half the instantaneous value of said first weighted signal, said signal consolidation means including first, second and third signal paths individually and respectively associated with said first, second and third signal selection signals, said first signal path including means for supplying said first redundant signal as said output signal when said associated first signal selection signal is supplied by said signal selection logic, said second signal path including means for supplying said second weighted signal as said output signal when said associated second signal selection signal is supplied by said signal selection logic, said third signal path including means for supplying said first weighted signal as said output signal when said associated third signal selection signal is supplied by said signal selection logic.

11. The signal selection apparatus of claim 10 wherein said first, second and third signal paths of said signal consolidation means respectively include first, second and third controlled gain means, each of said first, second and third controlled gain means having an input terminal and an output terminal, the input terminals of said first, second and third controlled gain means respectively connected for receiving said first redundant signal, said second weighted signal and said first weighted signal, said output terminal of said first, second and third controlled gain means being coupled to one another for supplying said output signal of said signal selection apparatus, said first, second and third controlled gain means being respectively associated with said first, second and third signal selection signals to exhibit a gain factor of substantially unity when the associated one of said first, second and third signal selection signals is supplied by said signal selection logic, said first, second and third controlled gain means exhibiting a gain factor of substantially zero when a signal selection signal other than said associated signal selection signal is suplied by said signal selection logic.

12. The signal selection apparatus of claim 11 wherein each of said first, second and third signal paths further includes a first summing means having an additive input terminal, a subtractive input terminal, and an output terminal, the output terminals of said first summing means of said first, second and third signal paths being respectively connected to the input terminals of said first, second and third controlled gain means, the additive input terminals of said first summing means of said first, second and third signal paths being respectively connected for receiving said first redundant signal, said second weighted signal and said first weighted signal, each of said first, second and third signal paths further including a second summing means having an additive input terminal, a first subtractive input terminal and an output terminal, said first subtractive input terminal of each of said second summing means of said first, second and third signal paths being connected to receive said output signal of said signal selection apparatus, said additive input terminal of said second summing means of each of said first, second and third signal paths being connected to the output terminal of that one of said first summing means located within the same one of said first, second and third signal paths, each of said first, second and third signal paths further including integrating means having an input terminal and an output terminal, said input terminal of said integrating means of said first, second and third signal paths being connected to said output terminal of that one of said second summing means located within the same one of said first, second and third signal paths, said output terminal of each of said integrating means of said first, second and third signal paths being connected to said subtractive input terminal of that one of said first summing means located within the same one of said first, second and third signal paths.

13. The signal selection apparatus of claim 12 wherein each of said second summing means of each of said first, second and third signal paths further includes a second subtractive input terminal, said first signal path further including first feedback means connected between said output terminal of said first signal path integrating means and said second subtractive terminal of that one of said second summing means located in said first signal path, said second signal path further including second feedback means connected between said output terminal of said second signal path integrating means and said second subtractive input terminal of that one of said second summing means located in said second signal path, said third signal path further including third feedback means connected between said output terminal of said third signal path integrating means and said second subtractive input terminal of said second summing means located in said third signal path, each of said first, second and third feedback means respectively responsive to said first, second and third signal selection signals to exhibit a predetermined gain factor when that one of said first, second and third signal selection signals associated with the signal path including said first, second and third feedback means is supplied by said signal selection logic, each of said first, second and third feedback means exhibiting a gain factor of substantially zero when a first, second and third signal selection signal that is not associated with said one of said signal paths including said first, second and third feedback means is supplied by said signal selection logic.

14. A triply redundant signal selection system comprising:

first, second and third redundant signal sources for supplying first, second and third redundant signals, and first redundant signal source being a precision signal source for supplying a more precise signal than the signals supplied by said second and third signal sources;

failure detection means for defining an operational state and a failure state for each of said first, second and third signal sources, said failure detection means including first comparator means responsive to said first, second and third redundant signals for comparing said first, second and third redundant signals one with another, said first comparison means including means for supplying a first failure signal having a first predetermined value when said first redundant signal is greater than each of said second and third redundant signals by a predetermined amount and having a second predetermined value when said first redundant signal does not exceed said second and third redundant signals by said predetermined amount, said first comparator means including means for supplying a second failure signal having a first predetermined value when said second redundant signal is greater than each of said first and third redundant signals by a predetermined amount and having a second predetermined value when said second redundant signal does not exceed said first and third redundant signals by said predetermined amount, said first comparator means further including means for supplying a third failure signal having a first predetermined value when said third redundant signal is greater than each of said first and second redundant signals by a predetermined amount and having a second predetermined value when said third redundant signal does not exceed said first and second redundant signals by said predetermined amount;

signal selection logic means responsive to said first, second and third redundant signals and responsive to said first, second and third failure signals for supplying signal selection signals, said signal selection logic including second comparator means responsive to said first, second and third redundant signals for detecting when said first redundant signal deviates from both said second and third redundant signals by at least a predetermined signal deviation, said second comparator means including means for supplying a suspect state signal having a first predetermined value when said deviation of said first redundant signal from said second and third redundant signals exceeds said predetermined signal deviation and having a second predetermined value when said deviation of said first redundant signal from said second and third redundant signals does not exceed said predetermined signal deviation, said signal selection logic means including means for supplying a first selection signal when said first failure signal is said second predetermined value concurrently with one of said second and third failure signals being said first predetermined value and for supplying a first selection signal when said first failure signal is said second predetermined value concurrently with said suspect state signal being said second predetermined value; and signal consolidation means responsive to said first, second and third redundant signals and said selection signals supplied by said signal selection logic for supplying an output signal derived from said first, second and third redundant signals, said signal consolidation means including first signal control means responsive to said first signal selection signal for supplying said first redundant signal as said output signal whenever said first signal selection signal is supplied by said signal selection logic means, said signal consolidation means including second signal control means responsive to said first signal selection signal for supplying a first mathematically weighted signal including equal signal contribution from at least said second and third redundant signals whenever said first signal selection signal is not supplied.

15. The triply redundant signal selection system of claim 14 wherein said signal selection logic further includes means for supplying a second signal selection signal when said suspect signal is said first predetermined value concurrent with each of said first, second and third failure signals being said second predetermined value, said signal selection logic further including means for supplying a third signal selection signal when said first failure signal is said first predetermined value; and, wherein said second signal control means of said signal consolidation means is responsive to said third signal selection signal to supply said first mathematically weighted signal as a signal equal to the sum of one-half of each of said second and third redundant signals whenever said third signal selection signal is supplied by said signal selection logic, said signal consolidator means further including third signal control means for supplying a second mathematically weighted signal as said output signal when said signal selection logic supplies said second signal selection signal, said second mathematically weighted signal being equal to the sum of one-half said first mathematically weighted signal and one-half of said first redundant signal.

16. The signal selection system of claim 15 wherein said signal consolidator means further includes transient control means responsive to said first, second and third signal selection signals to control said output signal during a predetermined time interval immediately subsequent to said signal selection logic means supplying said first, second and third signal selection signals, said transient control means including means for establishing the value of said output signal at the time at which said first, second and third signal selection signals are supplied equal to a first output value, said first output value being substantially equal to the value of said output signal supplied immediately prior to the time at which said first, second and third signal selection signals are supplied by said signal selection logic means, said transient control means further including means for supplying said output signal at predetermined values intermediate to and mathematically related to said first output value and the value of said output signal being supplied by said first, second and third signal control means of said signal consolidation means, said transient control means being configured and arranged to supply an output signal during said predetermined time interval that smoothly transists between said first output value and the value of said output signal being supplied by said first, second and third signal control means at the time said predetermined time interval ends.

* * * * *

UNITED STATES PATENT AND TRADEMARK OFFICE
CERTIFICATE OF CORRECTION

PATENT NO. : 4,105,900
DATED : August 8, 1978
INVENTOR(S) : Donald L. Martin et al.

It is certified that error appears in the above-identified patent and that said Letters Patent are hereby corrected as shown below:

Column 1, line 6, "fail/operational/fail/passive" should be —fail/operational-fail/passive—.

Column 1, line 18, "preforming" should be —performing—.

Column 2, line 27, "system" should be —systems—.

Column 2, line 56, "emenable" should be —amendable—.

Column 3, line 22, "will" should be —with—.

Column 4, line 37, "weighed" should be —weighted—.

Column 4, line 43, "arraged" should be —arranged—.

Column 6, line 19, "weighed" should be —weighted—.

Column 13, line 16, "1/2 S10 + 1/4 $(S_{12} + S_{14})$" should be —1/2 $S_{10}$ + 1/4 $(S_{12} + S_{14})$—.

Column 19, line 27, "conncted" should be —connected—.

Column 19, line 33, "CH1FAIL" should be —CH1FAIL—.

Column 19, line 36, "COM 184 FAIL" should be —COMP 184 FAIL—.

Column 19, line 49, "$\overline{(\text{CH1FAIL}}$" should be —$\overline{\text{CH1FAIL}}$—.

Column 21, line 18, "or" between "signals" and "momentary" should be —of—.

Column 21, line 23, "systen" should be —system—.

Column 23, line 63, "suplied" should be —supplied—.

Column 25, line 35, "perious" should be —previous—.

Column 30, line 12, "suplied" should be —supplied—.

Column 31, line 15, "and" should be —said—.

UNITED STATES PATENT OFFICE
CERTIFICATE OF CORRECTION

Patent No. 4,105,900　　　　　　　　　　Dated August 8, 1978

Inventor(s) Donald L. Martin et al.

It is certified that error appears in the above-identified patent and that said Letters Patent are hereby corrected as shown below:

Column 31, line 15, "and" should be -- said --.

Signed and Sealed this

Sixth Day of March 1979

[SEAL]

Attest:

RUTH C. MASON
Attesting Officer

DONALD W. BANNER
Commissioner of Patents and Trademarks